United States Patent
Shafiullah

(10) Patent No.: US 12,283,818 B1
(45) Date of Patent: Apr. 22, 2025

(54) SYSTEM AND METHOD FOR MITIGATION OF LOW-FREQUENCY OSCILLATIONS OF POWER SYSTEM NETWORK

(71) Applicant: KING FAHD UNIVERSITY OF PETROLEUM AND MINERALS, Dhahran (SA)

(72) Inventor: Md Shafiullah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 47 days.

(21) Appl. No.: 18/506,665

(22) Filed: Nov. 10, 2023

(51) Int. Cl.
*H02J 3/24* (2006.01)

(52) U.S. Cl.
CPC ........... *H02J 3/241* (2020.01); *H02J 2203/10* (2020.01); *H02J 2203/20* (2020.01)

(58) Field of Classification Search
CPC ..... H02J 3/241; H02J 2203/10; H02J 2203/20
USPC ........................................................ 307/102
See application file for complete search history.

(56) References Cited

U.S. PATENT DOCUMENTS

2022/0197233 A1 6/2022 He et al.

FOREIGN PATENT DOCUMENTS

| CN | 115271150 A | 11/2022 |
| CN | 115933391 A | 4/2023 |
| CN | 115983507 A | 4/2023 |

OTHER PUBLICATIONS

Aref et al. ; Oscillation Damping Neuro-Based Controllers Augmented Solar Energy Penetration Management of Power System Stability ; Energies 2023, 16 ; Mar. 2, 2023 ; 21 Pages.

*Primary Examiner* — Hal Kaplan
(74) *Attorney, Agent, or Firm* — Oblon, McClelland, Maier & Neustadt, L.L.P.

(57) ABSTRACT

A method and system for mitigating low-frequency oscillations of a power system network (PSN). The method includes receiving multiple data sets from the PSN, comprising values of terminal voltage, a real power, and a reactive power. The method further employs the multiple data sets to a fuzzy c-means clustering technique, a deep learning technique and a whale optimization algorithm to generate a pair of parameter values for a power system stabilizer controlling a steady-state of the power system network.

15 Claims, 15 Drawing Sheets

SYSTEM AND METHOD FOR MITIGATION OF LOW-FREQUENCY OSCILLATIONS OF POWER SYSTEM NETWORK

BACKGROUND OF THE INVENTION

Technical Field

The present disclosure is related to methods and systems for mitigation of low-frequency oscillations of power system networks. In particular, the present method and system employ a fuzzy c-means clustering technique followed by a combination of deep learning technique and whale optimization algorithm for mitigation of low-frequency oscillations of the power system networks.

Description of Related Art

The "background" description provided herein is for the purpose of generally presenting the context of the present embodiments. Work of the presently named inventors, to the extent it is described in this background section, as well as aspects of the description which may not otherwise qualify as prior art at the time of filing, are neither expressly or impliedly admitted as prior art against the present invention.

The demand for energy has been increasing significantly due to the growing population and businesses. Typically, electricity networks operate at peak capacity to meet these energy demands. Consequently, power systems operate at their full capacity to meet the energy demands. However, while operating at full capacity, the system constraints are broken, leading to increased instability as the system parameters fluctuate. This instability results in higher losses compared to gains while fulfilling energy needs within the electricity network. One of the reasons for loss is the production of low-frequency oscillations (LFO) due to system instability.

The development and utilization of renewable energy has gradually received worldwide attention to tackle problems such as the shortage of fossil fuels and the greenhouse effect. Power network systems using renewable energy are environmentally friendly by reducing reliance on fossil fuels. Wind energy is one such renewable energy with abundant reserves and growth potential. For large scale usage of wind energy, it is required to predict wind power to ensure reliability and stability of the electricity network for power generation, dispatch, and maintenance. However, with the volatile characteristics of wind energy, the output power of wind energy is unstable which leads to overall system instability. On one hand, renewable energy facilitates power networks by efficiently fulfilling energy demands. However, on the other hand, the addition of the renewable energy may lead to the production of low-frequency oscillations (LFO), which could be one of the reasons for power system faults.

Low-frequency oscillations (LFO) are introduced into unstable electrical networks, mainly due to reasons such as the weakly damped oscillation mode of the electrical network, the instability of the speed control system, the improper setting of primary frequency modulation parameters, excitation system defects or abnormalities, and/or the unique characteristics of the renewable energy sources such as solar, wind, biomass, and others. The dominant frequency range of the low-frequency oscillations typically falls between 0.1 and 2.5 Hz, significantly impacting power systems with weak transmission lines. Therefore, addressing the dominant frequency associated with the LFO range is essential for maintaining power network stability. Insufficient damping of LFO can lead to dynamic instability, potentially resulting in network failures.

To safeguard power networks against such situations, damping is required to control the low frequency oscillations. Traditionally, synchronous generators connected to the power systems aid with the damping of low-frequency oscillations. It is achieved through appropriate adjustment of automatic voltage regulator (AVR) parameters or by modifying the excitation supply of synchronous generators. However, synchronous generators with high-gain AVR can amplify LFO and reduce rotor damping torque. It has been shown that a critical aspect of designing an effective solution for damping of low-frequency oscillations lies in modifying power system stabilizer (PSS) parameters.

Advancements in power technology have allowed devices related to flexible alternating current transmission system (FACTS) to be widely used in electric power networks. In fact, FACTS devices are frequently integrated into power system networks and are used to analyze the steady-state performance of the power system network to enhance its performance. The dynamic features of power networks, such as power, current, phase angle, impedance, mitigation of inter-area LFOs, preservation of an appropriate voltage profile, optimal capacity supply, and reactive power shipment, can all be improved by FACTS devices, thereby enhancing the network's stability.

FACTS devices, such as a unified power flow controller (UPFC) that may comprise series and shunt configurations, use artificial intelligence algorithms to analyze power system properties. There are numerous advantages of UPFC. For example, with the deployment of the UPFC, the operational variables of the electric power supply system, including bus voltage and phase angle, along with line reactance, can be adjusted. Another example is the enhancement of control over the continuous power flow among transmission lines with the assistance of UPFC. Additionally, transient stability, voltage control capability, LFO mitigation, and power loss reduction can all be improved with the aid of UPFC.

There are a multitude of artificial intelligence algorithms that UPFC uses to fine-tune the control parameters of an LFO with or without FACTS devices. These algorithms damp the LFO and ensure the operational stability of power system networks by precisely mitigating the LFO. Examples of these algorithms include, but are not limited to, water cycle algorithm, genetic algorithm, backtracking search algorithm, differential evolution, etc. Other examples include teaching-learning-based optimization (TLBO) and particle swarm optimization (PSO), which are used to adjust the settings of a static series synchronous compensator for investigating the stability profile of a single-machine infinite bus (SMIB) network. Additionally, there is a dolphin echo-location optimization (DEO) approach and the use of thyristor-driven series capacitors to facilitate the continuous coordination of the power system stabilizer (PSS) for the SMIB network stability augmentation. However, these approaches are typically offline and are only suitable for fine-tuning PSS settings for specific operating states. Since, power network operating conditions are constantly changing due to fluctuating demand, the use of artificial intelligence algorithms for real-time PSS parameter determination and adjustment is essential.

Accordingly, there is a need for a system and method that can perform real-time PSS parameter adjustment to effectively mitigate LFO in power system networks. The present disclosure describes the application of a fuzzy c-means clustering based model to a combination of whale-optimization algorithm and deep learning technique to adjust PSS parameters to meet such a need. The presently disclosed method and system improve the stability of power system networks, including power system networks that use renewable energy sources, by effectively mitigating low-frequency oscilllations.

SUMMARY

The present embodiments disclose a method for mitigation of low-frequency oscillations of a power system network. The method includes receiving a plurality of data sets from the power system network. Each data set comprises a terminal voltage value, a real power value and a reactive power value. The method further includes receiving a pair of predetermined parameter values of the power system network, the power system network having zero low-frequency oscillations with the said values. The method further includes subjecting the plurality of data sets to a fuzzy c-means clustering technique to create a plurality of clustered data sets. The method further includes subjecting the plurality of clustered data sets to a deep learning technique to generate a pair of parameter values. The method further includes subjecting a whale optimization algorithm to the pair of parameter values to generate an adjusted pair of parameter values. The method further discloses a power system stabilizer that is coupled to the power system network. The method further includes applying the adjusted pair of parameter values to the power system stabilizer for mitigation of low-frequency oscillations of the power system network.

In some embodiments, the method further includes controlling a steady state of the power system stabilizer with the adjusted pair of parameter values.

In some embodiments, the adjusted pair of parameter values comprises a network gain parameter and a time constant parameter.

In some embodiments, the method further includes training a deep learning technique using a plurality of sets of operating conditions of the power system network, including at least one selected from a terminal voltage value, a real power, and a reactive power value.

In some embodiments, the method further includes training the deep learning technique using the pair of predetermined parameter values of the power system network.

In some embodiments, the deep learning technique comprises at least two deep learning subnetworks.

In some embodiments, the method further includes training the at least two deep learning subnetworks using at least two clustered data sets.

In some embodiments, the at least two clustered data sets are received from performing the fuzzy c-means clustering technique.

In some embodiments, the power system network is a single machine infinite bus (SMIB).

In some embodiments, the method further includes coupling the power system stabilizer to a first terminal of a synchronous generator.

In some embodiments, a single-machine infinite bus is connected to a second terminal of the synchronous generator via a transmission line.

In some embodiments, the power system stabilizer is a single-stage lead-lag controller.

In some embodiments, the power system stabilizer is electrically coupled with a unified power flow controller.

In some embodiments, the power system network comprises a plurality of modes of steady state.

In some embodiments, the method further includes employing the fuzzy c-means clustering technique, the deep learning technique, and the whale optimization algorithm to obtain the plurality of modes of steady state of the power system network.

The foregoing general description of the illustrative embodiments and the following detailed description thereof are merely exemplary aspects of the teachings of the present embodiments, and are not restrictive.

BRIEF DESCRIPTION OF THE DRAWINGS

A more complete appreciation of the present embodiments and many of the attendant advantages thereof will be readily obtained as the same becomes better understood by reference to the following detailed description when considered in connection with the accompanying drawings, wherein.

DETAILED DESCRIPTION

Figure 1A:
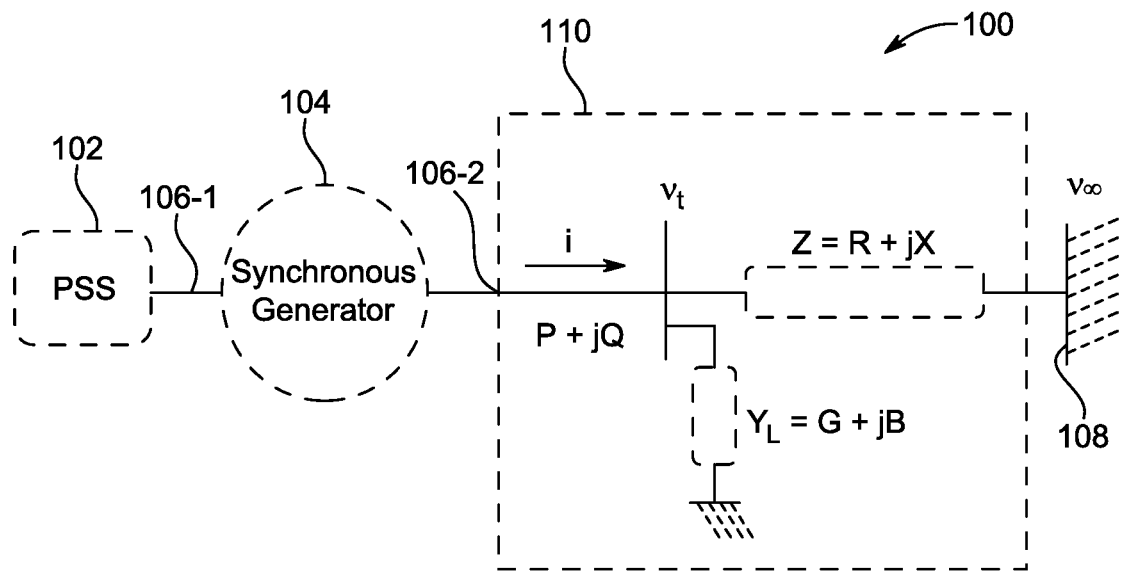
FIG. 1A illustrates a structural view of a single-machine infinite bus (SMIB) power system network, as a first testing network, coupled with a power system stabilizer (PSS), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Further, the terms such as power system network, electric network, power network, test power system, test or testing network are used as synonyms henceforth and used interchangeably.

The present embodiments are directed to methods and systems for performing power system stabilizer (PSS) parameter adjustment and/or maximization accurately in real-time by employing fuzzy c-means (FCM) clustering and a combination of deep learning technique and whale optimization algorithm. Fuzzy c-means (FCM) clustering is associated to fuzzy clustering family based on a particular objective function that has been used in load profiling tasks as a standalone algorithm or as a multi-algorithm comparison. The FCM clustering algorithm has been modified and used for realization of a dissolved gas analysis (DGA) data clustering. The FCM method divides each data set into varying degrees of membership in several clusters, allowing for the simultaneous management of load profiles that may belong to many groups. Therefore, in attaining real-time power system stabilizer (PSS) parameters optimization accurately, the embodiments herein adjust the data sets attained from the networks by employing FCM clustering approach to improve the performance of a combination of whale optimization algorithm and deep learning technique (WOA-DL) tool. The power system's stability indicators, i.e., the PSS parameters are then analyzed to determine the performance of the FCM clustering oriented WOA-DL tool. The embodiments herein are verified by testing on two distinct electric testing networks. The first testing network includes a single-machine infinite bus (SMIB) power system coupled with a power system stabilizer (PSS), while the second testing network involves a single-machine infinite bus (SMIB) power system coupled with a power system stabilizer (PSS) and unified power flow controller (UPFC).

FIG. 1A illustrates a structural view of a single-machine infinite bus (SMIB) power system network 100, as a first testing network, coupled with a power system stabilizer (PSS) 102, according to an embodiment.

As shown in FIG. 1A, the SMIB power system network 100 includes a PSS 102 and a synchronous generator 104. In examples, the SMIB power system network 100 may be referred to as first power system network 100. The synchronous generator 104 has a first terminal 106-1 and a second terminal 106-2. The PSS 102 is conjoined at the first terminal 106-1. The SMIB power system network 100 further includes a first infinite bus 108. The second terminal 106-2 is coupled with the first infinite bus 108 via a transmission line 110 having certain reactance Z and impedance $Y_L$.

Figure 1B:
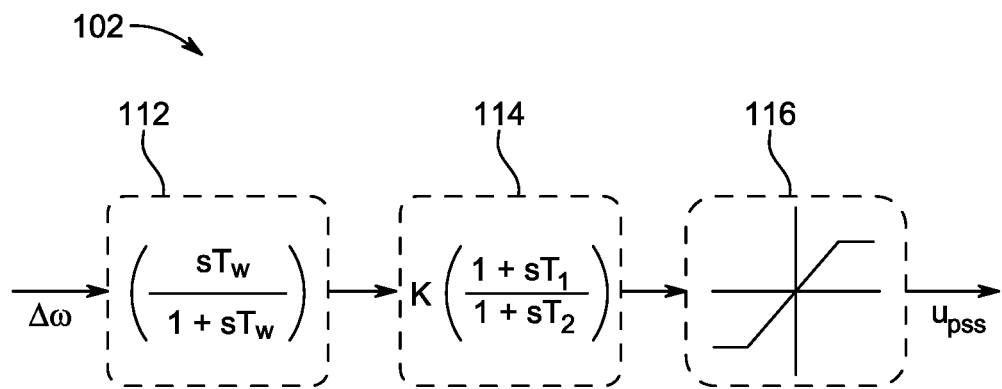
FIG. 1B illustrates a structural view of the PSS including a standard single-stage lead-lag controller, according to certain embodiments.

FIG. 1B illustrates a structural view of the PSS 102 including a standard single-stage lead-lag controller 114, according to an embodiment.

As shown in FIG. 1B, the PSS 102 includes a plurality of components, such as a washout filter 112 and a control signal limiter 116. The washout filter 112 refers to a stable high-pass filter with zero static gain. This leads to the filtering of lower-frequency inputs signals, leaving the steady state output unaffected by unwanted low-frequency inputs. In an embodiment, the PSS 102 includes a single-stage lead-lag controller 114 coupled with the washout filter 112 and the control signal limiter 116. In an embodiment, the SMIB power system network 100, after integrating the PSS 102, may be represented with six states using state-space model.

Mathematically, a model for the SMIB power system network 100 may be represented by state-space modelling using Equation (1) provided below:

$$X_1 = A_{c1} \Delta X_1 \quad (1)$$

where, $A_{c1}$ represents state matrix. The eigenvalues of the state matrix ($A_{c1}$) corresponding to the SMIB power system network 100 represent the modes of the SMIB power system network 100.

Figure 1C:
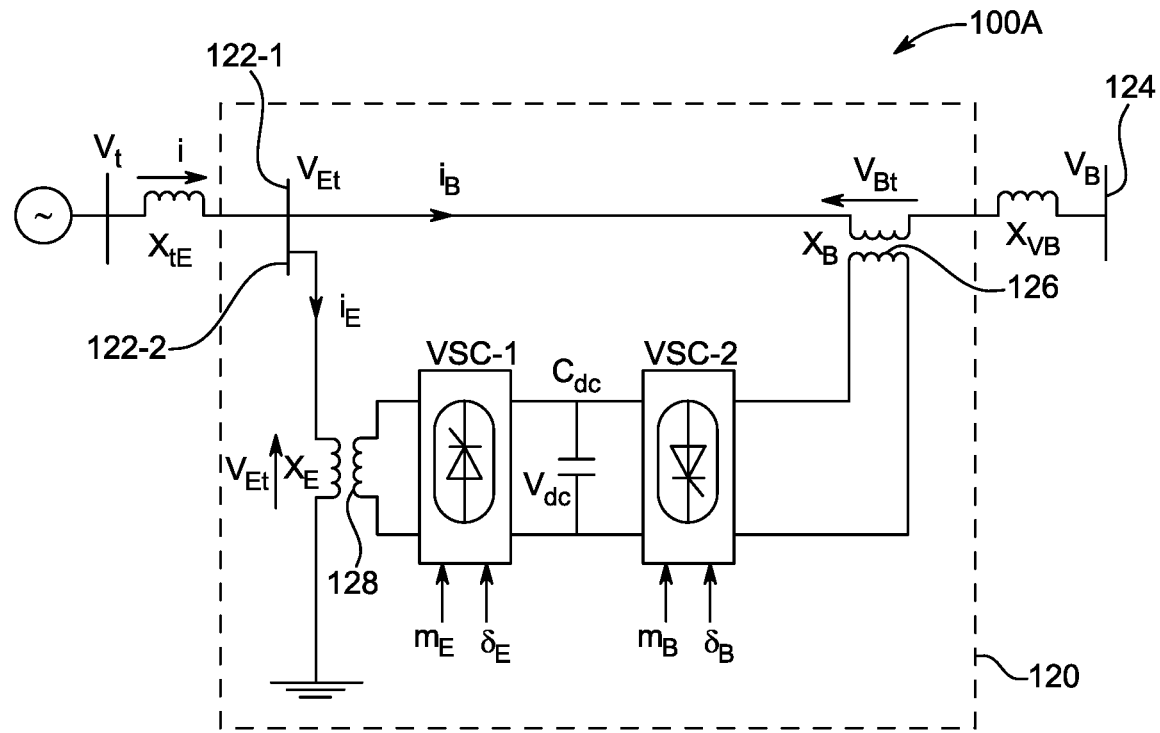
FIG. 1C illustrates a structural view of a single-machine infinite bus (SMIB) power system network, as a second testing network, coupled with a unified power flow controller (UPFC) device synchronized power system stabilizer (PSS), according to certain embodiments.

FIG. 1C illustrates a structural view of SMIB power system network 100A, as a second testing network, coupled with unified power flow controller (UPFC) device synchronized PSS 120, according to an embodiment. As may be understood, the SMIB power system network without UPFC is represented by the reference numeral "100" and the SMIB power system network coupled with UPFC is represented by the reference numeral "100A". In examples, the SMIB power system network 100B may be referred to as the second power system network 100B.

As shown in FIG. 1C, the UPFC device 120 is coupled at a first terminal 122-1 of the SMIB power system network 100A. A second terminal 122-2 is coupled with an infinite bus 124 through a transmission line with a specific reactance to enhance the overall system's stability outline. In an embodiment, the UPFC device 120 is conjoined to the SMIB power system network 100A through a boosting transformer 126 and an excitation transformer 128 for coordinating with the PSS. The boosting transformer 126 and the excitation transformer 128 have amplitude modulation ratios of $m_B$ and $m_E$, respectively. Also, the control parameters of the UPFC device 120 include phase angles and amplitude modulation ratios.

Figure 1D:
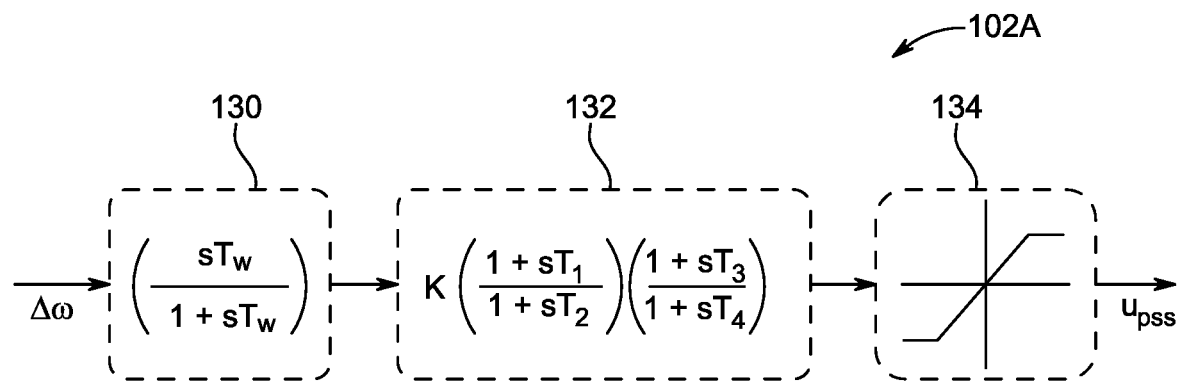
FIG. 1D illustrates a structural view of a power system stabilizer (PSS) having two stages in the single-machine infinite bus (SMIB) power system network, according to certain embodiments.

FIG. 1D illustrates a structural view of a PSS 102A having two stages in the SMIB power system network 100A, according to an embodiment. The PSS 102A includes a plurality of components, such as a washout filter 130, a double-stage lead-lag controller 132, and a control signal limiter 134 coupled with the double-stage lead-lag controller 132. In an embodiment, the SMIB power system network 100A, after integrating the PSS 102A, may be represented with nine states using state-space model. Mathematically, a model for the SMIB power system network 100A may be represented by a state-space modelling using Equation (2) provided below:

$$X_2 = A_{c2} \Delta X_2 \quad (2)$$

where, $A_{c2}$ represents the state matrix. The eigenvalues of the state matrix ($A_{c2}$) corresponding to the SMIB power system network 100A represent the modes of the SMIB power system network 100A. In an embodiment, the SMIB power system network 100 or the SMIB power system network 100A includes a plurality of steady-state modes.

In conjugation with FIG. 1A, FIG. 1B, FIG. 1C, and FIG. 1D, for the SMIB power system network 100 or the SMIB power system network 100A to be stable even in the presence of disturbances, all the eigenvalues of the SMIB power system network 100 or the SMIB power system network 100A must be placed within the area of the left side of the argand plane (not shown). This means that real portions of the eigenvalues must be negative. In other words, the stability of the SMIB power system network 100 or the SMIB power system network 100A is ensured when all the eigenvalues are located on the left area of the argand plane, which implies that all eigenvalues must be confirmed with negative real parts. On the other hand, any eigenvalue with a positive real portion may cause the SMIB power system network 100 or the SMIB power system network 100A to become unstable. In examples, the SMIB power system network 100 or the SMIB power system network 100A may become unstable when any of the eigenvalues of the corresponding state matrix has a real positive component. The SMIB power system network 100 and the SMIB power system network 100A may be referred to as power system network 100 and power system network 100A, hereinafter.

To confirm the stability of the power system network 100 or the power system network 100A, it is desirable to fine-tune the PSS variables so that all eigenvalues of the state matrix of the desired electrical supply network are located to the left side of the argand plane. This adjustment dampens the LFO and improves system stability. In order to dampen the LFO of the power system network 100 or the power system network 100A in real-time, a combination of a deep learning technique, a whale optimization algorithm, and a fuzzy c-means clustering technique may be employed to obtain a pair of parameters, for example a network gain parameter 'K' and a time constant parameter '$T_1$', for a steady state of the power system network 100 or the power system network 100A. Accordingly, the present embodiments include a method for mitigation of LFO of the power system network 100 or the power system network 100A. An initial step of the method includes receiving a plurality of data sets from the power system network 100 or the power system network 100A. Each data set comprises a terminal voltage value, a real power value, and a reactive power value. The method further includes receiving a pair of predetermined parameter values of the power system network 100 or the power system network 100A. At predetermined parameter values, the power system network 100 or the power system network 100A is stable with zero low frequency oscillations (LFO). Further in the method, the plurality of data sets received from the power system network 100 or the power system network 100A, are employed to a fuzzy c-means clustering technique to create a plurality of clustered data sets. The method further includes employing the plurality of clustered data sets to a deep learning technique to generate a pair of parameter values, (K and $T_1$). The method further includes employing a whale optimization algorithm to the pair of parameter values to generate an adjusted pair of parameter values. The PSS 102 coupled to the power system network 100 or the PSS 102A coupled to the power system network 100A, use the optimized pair of parameter values for mitigation of LFO of the power system network 100 or the power system network 100A.

Figure 2:
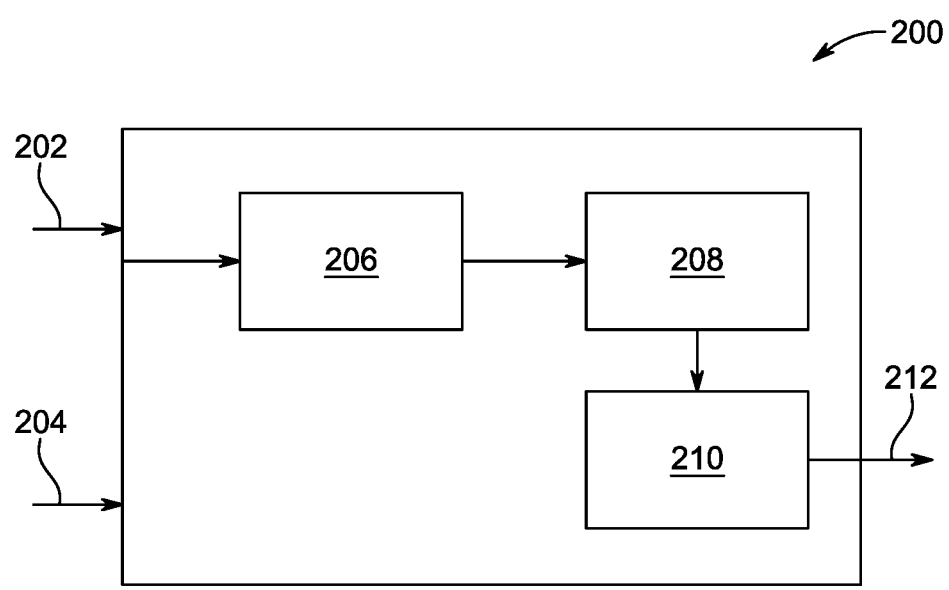
FIG. 2 illustrates a low frequency oscillation (LFO) mitigation system for a power system network, according to an embodiment.

In an embodiment, the method for mitigating the LFO in the power system network 100 or the power system network 100A may be implemented in a system 200 (also referred to as LFO mitigation system 200), described in FIG. 2. FIG. 2 illustrates the LFO mitigation system 200 for the power system network 100 or the power system network 100A, according to certain embodiments. The LFO mitigation system 200 may be electrically coupled, for example, with the power system network 100 or the power system network 100A, and is configured for mitigating the LFO produced in the power system network 100 or the power system network 100A at any moment. In an embodiment, the coupling may be wired or wireless.

The LFO mitigation system 200 may include a plurality of input terminals, such as a first input terminal 202 and a second input terminal 204. The first input terminal 202 and the second input terminal 204 are configured to receive a plurality of data sets from the power system network 100 or the power system network 100A. The first input terminal 202 and the second input terminal 204 may be configured to receive a pair of predetermined parameter values of the power system network 100 or the power system network 100A. Each data set includes a terminal voltage value ($V_t$), a real power value ($P_e$), and a reactive power value ($Q_e$) from the power system network 100 or the power system network 100A. The power system network 100 or the power system network 100A has zero LFOs with the predetermined parameter values. The LFO mitigation system 200 further includes an output terminal 212 for outputting the optimized pair of parameters.

The LFO mitigation system 200 further includes a fuzzy c-means (FCM) clustering module 206 and a deep learning (DL) module 208 connected with the output of the FCM clustering module 206. The LFO mitigation system 200 further includes a whale optimization module 210 connected with the output of the DL module 208. In an embodiment, the LFO mitigation system 200 may be implemented in the form of a software, hardware or in combination or hardware and software both, where the method for mitigation of the LFO of the power system network 100 or the power system network 100A is configured to be executed. In an embodiment, the LFO mitigation system 200 may be implemented in a server or a cloud where processing related to method for mitigation of LFO of the power system network 100 or the power system network 100A may be executed. In another embodiment, each individual module i.e., the FCM clustering module 206, the DL module 208, and the whale optimization module 210 of the LFO mitigation system 200 may be implemented on a separate server (not shown) and each server may coordinate with other server having separate functions of the LFO mitigation system 200 for executing a collective coordinative process corresponding to mitigation of LFO.

Initially, a plurality of loading scenarios for the power system network 100 (without UPFC) and the power system network 100A (with UPFC) is considered and the data related to real power ($P_e$), reactive power ($Q_e$), and the terminal voltage ($V_t$) is collected for the power system network 100 and the power system network 100A. The loading scenarios may illustrate the condition of the power system network 100 or the power system network 100A, such as light loading when the power demand is low, and normal loading and heavy loading, when the power demand is high, such as during peak hours. As such the LFO mitigation system 200 may receive data sets from the power system network 100 or the power system network 100A via the first input terminal 202. This is illustrated with an example. The minimum value and the maximum value for real power ($P_e$), reactive power ($Q_e$), and the terminal voltage ($V_t$) is received from the power system network 100 and the power system network 100A. The same is shown in Table 1, as below:

TABLE 1

Per unit (pu) operating ranges for the power system
network 100 and the power system network 100A

| Items | Power system network 100 | | Power system network 100A | |
|---|---|---|---|---|
| | Min value | Max value | Min value | Max value |
| Real power ($P_e$) | 0.42 | 1.15 | 0.60 | 1.30 |
| Reactive power ($Q_e$) | −0.28 | 0.40 | −0.16 | 0.40 |
| Terminal voltage ($V_t$) | 0.95 | 1.08 | 0.98 | 1.06 |

Based upon the minimum value and the maximum value for each operating conditions, the LFO mitigation system 200 may generate a data set for a number of loading scenarios, such as, for example for more than 1000 loading scenarios, for each of the power system network 100 and the power system network 100A. Accordingly, a plurality of data sets is created where each data set includes real power ($P_e$), reactive power ($Q_e$), and the terminal voltage ($V_t$) of plurality of loading scenarios.

In order to train the LFO mitigation system 200 to eliminate the LFO in the power system network 100 or the power system network 100A in real-time, the LFO mitigation system 200 is also configured to receive a pair of predetermined parameter values of the power system network 100 or the power system network 100A using the second input terminal 204. The predetermined parameter values are such values of parameters at which the power system network 100 or the power system network 100A has zero low-frequency oscillations. The LFO mitigation system 200 may store the predetermined parameter values as reference or ideal parameter values for each loading scenario for the power system network 100 and the power system network 100A. In an embodiment, the predetermined parameters values may be already stored in a memory (not shown) of the LFO mitigation system 200. As such, the LFO mitigation system 200 also has the reference parameter values corresponding to a plurality of loading conditions to nullify the LFO.

Once the plurality of data sets is generated, each data set is first processed based through Fuzzy C-means clustering. Fuzzy C-means clustering is a soft clustering technique that is defined to partition a given data set into a 'c' number of clusters based on an objective minimization function. The objective minimization function is generally formed following the values of membership functions of fuzzy set data and mean values of data points of related clusters. In the present embodiments, the FCM clustering module 206 is configured to accumulate the data points, for example the plurality of data sets received from the power system network 100 or the power system network 100A, in one cluster in such a way that those are as close as possible, while the data points remain as far as possible from the other clusters. The FCM clustering module 206 eventually performs the minimization of the objective function based on the summation of the values of membership functions of data points lying in a particular cluster and the sum of the mean values of the data points of the corresponding cluster. The FCM clustering module 206 is further configured to execute multiple mathematical equations stored in a memory (not shown) in the LFO mitigation system 200 for clustering the data sets, as below:

$$0 \leq \mu_{ji} \leq 1; \forall j, i \qquad (3)$$

$$\sum_{j=1}^{c} \mu_{ji} = 1; \forall i = 1, 2, \ldots \ldots n \qquad (4)$$

$$0 < \sum_{i=1}^{n} \mu_{ji} < 1; \forall j = 1, 2, \ldots \ldots c \qquad (5)$$

where, $\mu_{ij}$ is the value of the membership function of $i^{th}$ data point in $j^{th}$ cluster; and 'n' is the total number of data points within a particular cluster among the 'c' number of clusters.

Based on membership functions, the FCM clustering module 206 is configured to minimize the objective function, represented by Equation (6), to obtain an optimal number of clusters for a particular data set.

$$J_r(\mu, v, x) = \sum_{j=1}^{c} \sum_{x_i \in A_j} \|x_i - v_j\|^2 * \mu_{ji}^r; \forall\ i = 1, 2, \ldots \ldots n \quad (6)$$

where, $v_j$ is the mean of $A_j$ and, $A_j$ is the matrix that includes the data points of $j^{th}$ cluster; $x_i$ is the $i^{th}$ the data point that lay in $j^{th}$ cluster; and 'r' is a parameter that is selected as r≥1. The value of r depends on the data set which is clustered. The mean value ($v_j$) for a data subset corresponding to a particular cluster is represented by the following Equation (7), as below:

$$v_j = \frac{\sum_{i=1}^{n} x_i * \mu_{ji}^r}{\sum_{i=1}^{n} \mu_{ji}^r} \quad (7)$$

Accordingly, the FCM clustering module 206 clusters or partitions the data set in optimized numbers using Equations (1)-(7). Further, the FCM clustering module 206 is configured to separate the data set into two clusters/subsets of data following two different gravity points for each cluster/subset. The FCM clustering module 206 draws at least two silhouette plots for two clusters/partitions for each of the power system network 100 and power system network 100A respectively, and corresponding values are utilized in identifying the number of clusters for the received data set. In an embodiment, the FCM clustering module 206 may be configured to cluster the data sets into more than two clusters. The same is illustrated, for example, in FIG. 3A, FIG. 3B, FIG. 3C, and FIG. 3D considering the real power ($P_e$), reactive power ($Q_e$), and the terminal voltage ($V_t$) of the plurality of loading scenario as provided in Table 1.

Figure 3A:
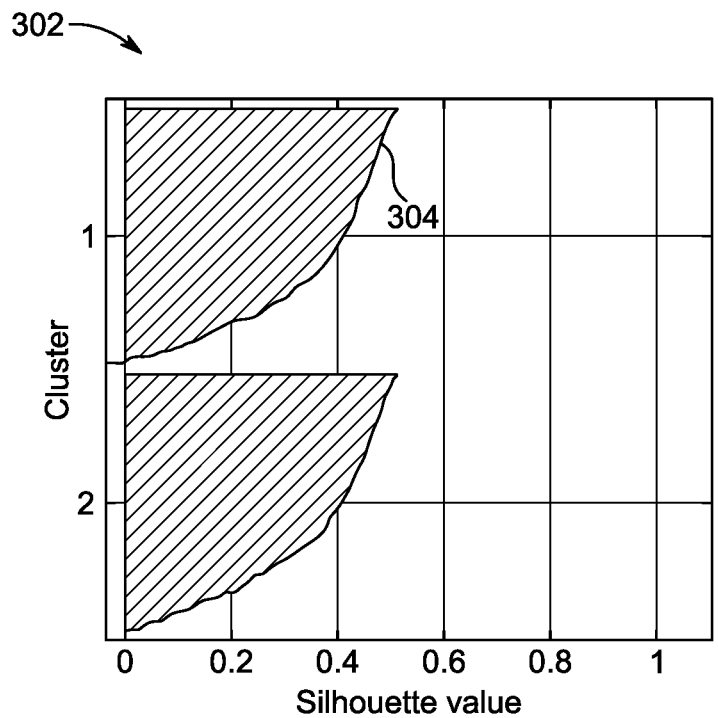
FIG. 3A shows a graphical representation illustrating a comparison of silhouette values and a number of clusters for provided training data sets of a first power system network, according to certain embodiments.

FIG. 3A shows a graphical representation 302 illustrating a comparison of silhouette values and the number of clusters for the provided training data sets of the power system network 100, according to an embodiment. As shown in FIG. 3A, the X axis indicates silhouette values, while the Y axis indicates the number of clusters. Furthermore, curve 304 indicates the clustered data set for the power system network 100. It can be observed that many objects/data points achieve higher silhouette values in the case of two clusters/partitions of the training data sets of the power system network 100.

Figure 3B:
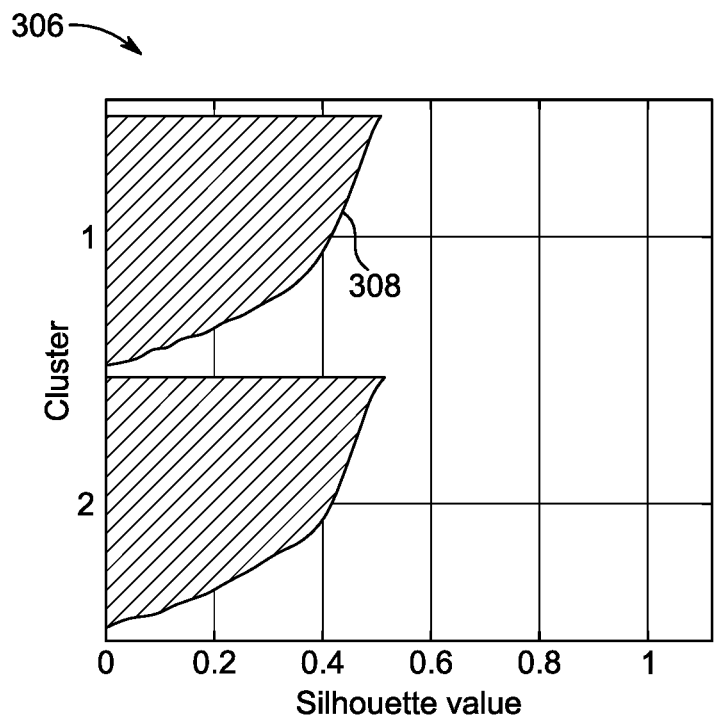
FIG. 3B shows a graphical representation illustrating a comparison of silhouette values and the number of clusters for the provided training data sets of a second power system network, according to an embodiment, according to certain embodiments.

FIG. 3B shows a graphical representation 306 illustrating a comparison of silhouette values and the number of clusters for the provided training data sets of the power system network 100A, according to an embodiment. As shown in FIG. 3B, the X axis indicates silhouette values, while the Y axis indicates the number of clusters. Furthermore, curve 308 indicates the clustered data set for the power system network 100A. It can be observed that many objects/data points achieve higher silhouette values in the case of two clusters/partitions of the training data sets of the power system network 100A.

Figure 3C:
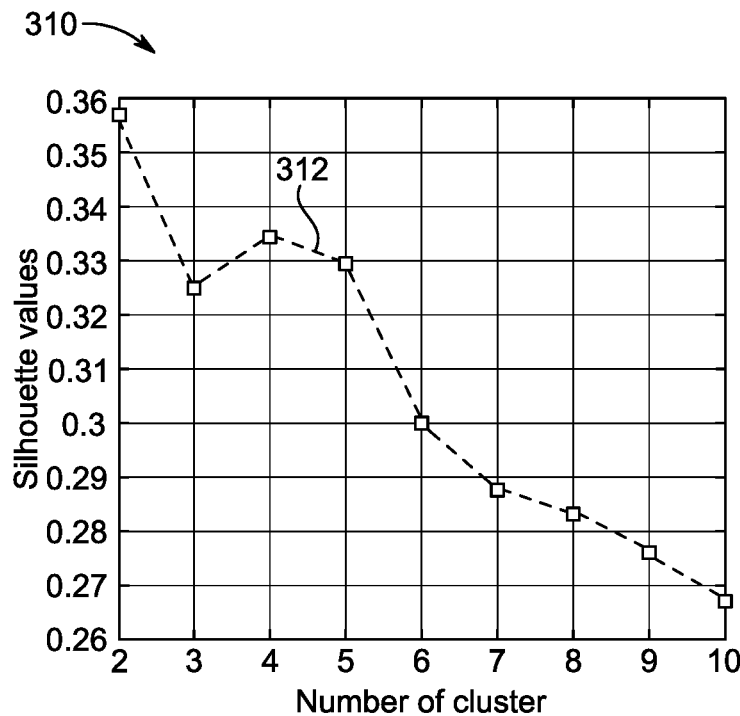
FIG. 3C shows a graphical representation illustrating silhouette values comparison for the first power system network, according to certain embodiments.

FIG. 3C shows a graphical representation 310 illustrating silhouette values comparison for the power system network 100, according to an embodiment. The X axis represents a number of clusters, while the Y axis represents silhouette values. Furthermore, curve 312 indicates that the data points included in two clusters for a training data set of the power system network 100 maintains higher silhouette values except for a few objects for the data set of the power system network 100, which are misclustered by negative silhouette values.

Figure 3D:
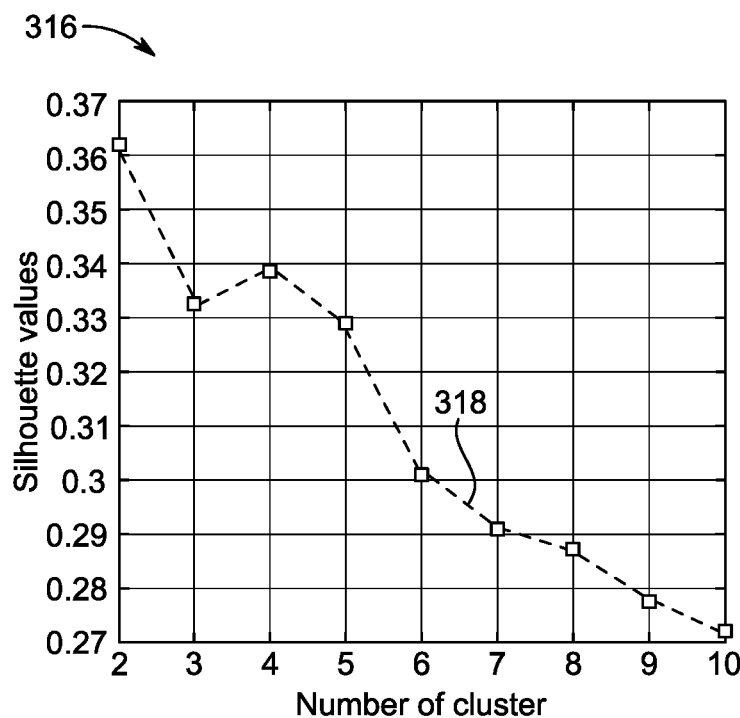
FIG. 3D shows a graphical representation illustrating silhouette values comparison for the second power system network, according to certain embodiments.

FIG. 3D shows a graphical representation 316 illustrating silhouette values comparison for the power system network 100A, according to an embodiment. Here again, the X axis represents a number of clusters, while the Y axis represents silhouette values. Furthermore, curve 318 indicates that the data points included in two clusters for a training data set of the power system network 100A maintains higher silhouette values except few objects for the data set of the power system network 100A, which may be misclustered by negative silhouette values.

Based upon FIG. 3A, FIG. 3B, FIG. 3C, and FIG. 3D, the FCM clustering module 206 clusters the data set into at least two clustered data sets by utilizing the fuzzy c-means clustering technique.

Figure 3E:
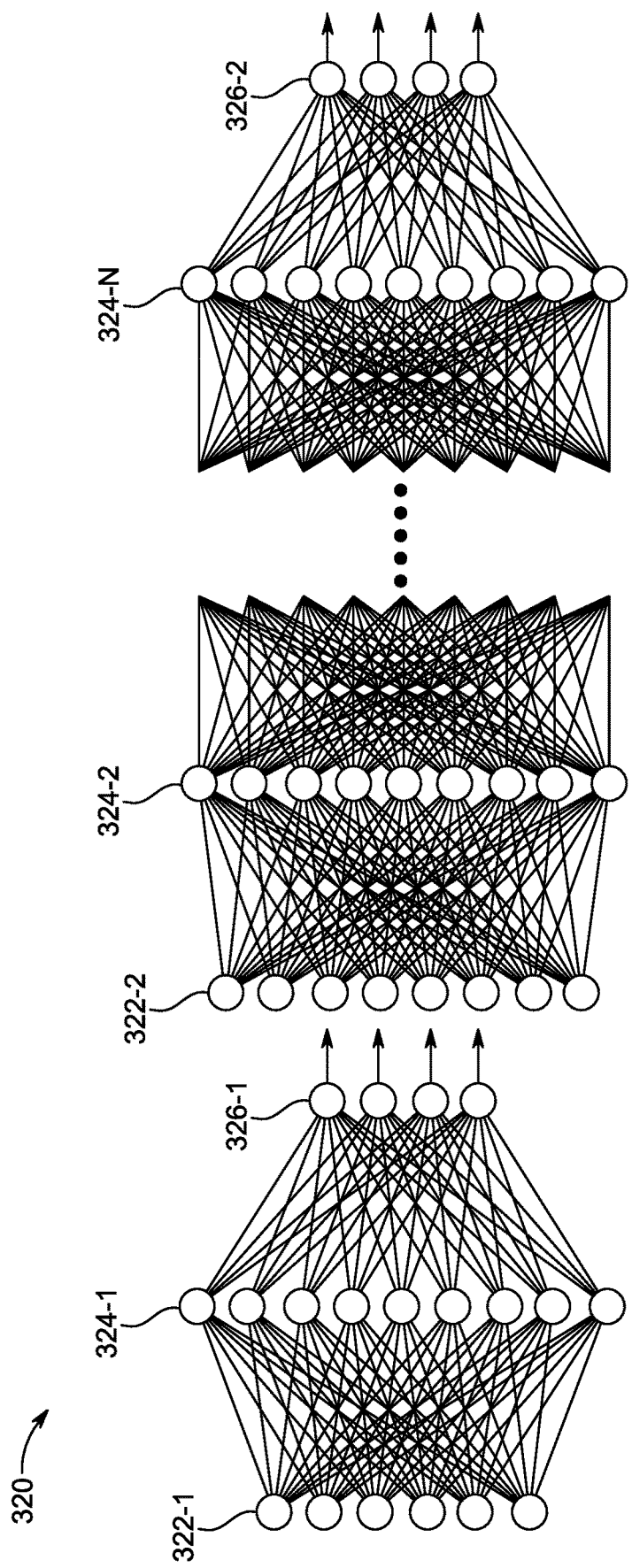
FIG. 3E illustrates an architecture of shallow neural networks and deep neural networks, according to certain embodiments.

Referring back to FIG. 2, once the at least two data sets are clustered for both power system network 100 and the power system network 100A, the at least two clustered data set are fed into the deep learning (DL) module 208 for training and generating a pair of parameter values for the PSS 102 or the PSS 102A. Deep learning (DL) is a branch of artificial intelligence (AI) that allows computers to deal with large volumes of data without preprocessing by learning from multiple data representations. Input, hidden, and output layers, as well as hidden layer neurons, activation functions, and linking weights and biases, are all included in DL designs, just as they are in shallow neural networks. The number of hidden layers is the primary difference; DL designs have more than two hidden layers as shown in FIG. 3E. In shallow neural networks, there are one or two hidden layers. Generally, DL techniques adjust the linking weights and biases during the training procedures to better predict by overcoming the bottlenecks and overfitting challenges of shallow neural network models. They also employ feature engineering to accelerate learning without requiring explicit design.

Deep learning (DL) is defined as a technique of teaching a machine to think like a human. It is built on iterative processes. An artificial neural network is used at different hierarchical layers to carry out this iterative procedure. In the early stages, the machines learn rudimentary knowledge, and as the levels continue, the information gets more complex. With each successive level, machines pick up new information and blend it with what they learned in the prior one. At the end of implementation of a DL technique, the system gathers a last piece of data, a compound input. This information is arranged in layers and mimics sophisticated logical thinking. Long short-term memory (LSTM) architecture is one among the several types of deep learning approaches. The LSTM is a recurrent neural network (RNN) with an individual memory cell that may retain data for long or short periods depending on the inputs. It maintains not just the most recently calculated data but also important data for a more extended period.

In the present embodiments, the DL module 208 is configured to employ the two clustered data set, generated from the FCM clustering module 206 to the deep learning technique for gaining better performance from the trained deep learning model to generate a pair of parameter values to real-time suppress LFOs from the power system network 100 or the power system network 100A. In the present embodiments, the pair of parameters of the PSS 102 or the PSS 102A comprises a network gain parameter (K) and a time constant ($T_1$). In an embodiment, the DL module 208 employs a long short-term memory (LSTM) architecture. In an embodiment, the DL module 208 may employ either a shallow neural network or a deep neural network. The basic fundamental design of shallow and deep neural network is illustrated in FIG. 3E.

FIG. 3E illustrates an architecture 320 of shallow neural network and deep neural network, according to an embodiment. In the shallow neural network, there is one hidden layer 324-1, whereas the deep neural network designs may have more than two hidden layers 324-(2-N). The shallow neural network has input layer 322-1 (where the clustered data set may be input to the shallow neural network) and output layer 326-1 that yields the outcome. Similarly, the deep neural network has input layer 322-2, hidden layers 324-(2-N), and output layer 326-2. The DL techniques adjust the linking weights and biases during the training procedures to better predict the pair of parameters.

Referring back to FIG. 2, the DL module 208 is trained using 70% of total data set based on different operating conditions of the power system network 100 or the power system network 100A which was separated into two clusters/subsets of data following two different gravity points for each cluster/subset. The data employed to train the DL module 208 is clustered/partitioned in optimized numbers using the FCM clustering module 206. The DL module 208 includes two deep-learning subnetworks, based either upon the shallow neural network or the deep neural network, which are trained using the at least two clustered data sets. Similar data points were gathered in each cluster for two gravity points to obtain a completely trained deep-learning model to achieve superior performance in predicting the crucial PSS parameters for suppressing LFOs. The silhouette plots and corresponding values were considered in finding the number of clusters that works better for the prescribed dataset, as illustrated by FIG. 3A, FIG. 3B, FIG. 3C, and FIG. 3D.

The DL module 208 includes a pair of predetermined parameter values. As such, for a plurality of loading scenarios, the LFO mitigation system 200 already has an appropriate final value of the predetermined parameter at which the LFO in the power system network 100 or the power system network 100A is zero. For each plurality of loading scenarios and the corresponding final value of the predetermined parameter, the DL module 208 is configured to compute and learn Eigenvalues and the minimum damping ratio (MDR) values corresponding to the predetermined parameter. The DL module 208, using the two subnetworks, learns the corresponding Eigenvalue and the MDR value in order for the power system network 100 or the power system network 100A to remain stable and with zero PSS value in a plurality of different operating scenarios.

Now, the DL module 208 is provided only with the initial data set values of real power, reactive power, and the voltage value. The DL module 208 may learn using 70% data set and identify the Eigenvalue corresponding to each data set values of real power, reactive power, and the voltage value. The DL module 208, based upon predetermined parameters, is configured to compute Eigenvalues and MDR values for each cluster of data sets and learn whether the computed eigenvalues and the MDR values corresponding to the real power, the reactive power, and the voltage value corresponds to zero PSS values. If the eigenvalues and the MDR values corresponding to plurality of data sets do not include values at which the PSS is zero, the DL module 208 further iterates the computing procedure to compute, learn, and train for new Eigenvalue and MDR values corresponding to a plurality of data sets after adjustments in the computed Eigenvalues and the MDR values, necessary to nullify the PSS in the power system network 100 and the power system network 100A. In the present embodiments, the iterative adjustment and learning process continues till the DL module 208 has completely learned to generate the pair of parameter values (K and $T_1$) based upon the learned Eigenvalues and the MDR values for each plurality of data sets for each type of loading scenario. The generated values of a pair of parameter values (K and $T_1$) are such that the PSS would be zero at that loading scenario. As such, the DL module 208 completely learns and trains from 70% data sets to generate the pair of parameter values (K and $T_1$) such that the PSS would be zero. Accordingly, the predetermined pair of parameter values act as reference parameter values that are useful in learning to identify and compute corresponding Eigenvalues and the MDR values at which the PSS is always zero, which is further utilized in learning to identify the necessary voltage values, real power values, and reactive power values computed from the corresponding Eigenvalues and the MDR values such that the PSS would be zero at each loading condition. Using the voltage values, real power values, and reactive power values from the data set, the DL module 208 learns to identify and compute corresponding Eigenvalues and the MDR values. If the Eigenvalues lies in the positive side of argand plane, the DL module 208 learns to modify the Eigenvalues and the MDR values for the corresponding data sets, and iteratively performs and learns the modification in Eigenvalues and the MDR values such that the PSS would be zero for that operating condition. As such, the DL module 208 uses the clustered data set to generate a pair of parameter values after training both subnetworks of the DL module 208.

In an embodiment, 30% of the data set is used for testing the DL module 208 once it has learned and trained to identify parameter values for the PSS 102 or the PSS 102A to nullify LFO. Once the DL module 208 generates the pair of parameter values, the pair of parameter values is provided to the whale optimization module 210 to optimize the parameter values obtained from the data set and learning. The whale optimization module 210 is configured to employ a swarm intelligence-based meta-heuristic algorithm to optimize the pair of parameter values received from the DL module 208 and identify the global optimum solution. The whale optimization algorithm mimics the hunting mechanism of humpback whales that is used to find the global optimum solution of mathematical equations. Therefore, the updated positions of the search agents are represented as follows:

$$\vec{X}(t+1) = \begin{cases} \vec{X^*}(t) - \vec{A} \cdot \vec{D} & \text{if } p < 0.5 \\ \vec{D'} \cdot e^{bl} \cdot \cos(2\pi l) + \vec{X^*}(t) & \text{if } p \geq 0.5 \end{cases} \quad (8)$$

where, p is chosen randomly in the range [0,1].

Therefore, in case of probability less than 0.5, search agents are updated radially towards the optimal location and shrink the encirclement, while for the probability greater or equal to 0.5, the search agents update their positions between the current positions of agents and the optimal location by mimicking a helix spiral-shaped movement like the humpback whales. X* is the current global best solution attained so far, $\vec{X}(t+1)$ is the vector of all search agents updated in the current iteration, and "·" is used for element-by-element multiplication. The whale optimization module 210 is further configured to update the current best global solution if a better solution than the current global best solution is attained from updated search agents based on a particular objective function. The whale optimization module 210 continues to execute the procedure until the convergence criteria is satisfied. The spiral logarithmic shape is defined using the constant "b," and "1" is a random number that is measured in the range [−1,1]. $\vec{A}$, $\vec{D}$, and $\vec{D'}$ are three coefficient vectors, where $\vec{D'}$ signifies the vector of distances between the current prey/current best solution and each of all current search agents. The whale optimization module 210 is further configured to evaluate $\vec{A}$, $\vec{D}$, and $\vec{D'}$ using following equations as:

$$\vec{A} = 2\vec{a} \cdot \vec{r} - \vec{a} \quad (9)$$

$$\vec{D} = |\vec{C} \cdot \vec{X}*(t) - \vec{X}(t)| \quad (10)$$

$$\vec{C} = 2 \cdot \vec{r} \quad (11)$$

$$\vec{D'} = |\vec{X^*}(t) - \vec{X}(t)| \quad (12)$$

where, $\vec{r}$ is measured as a random vector in the range [0,1], and $\vec{a}$ is linearly decayed from '2' to '0' over the period of iterations/simulation. Therefore, the coefficient vector $\vec{A}$ is defined within the range of '−2' and '2'.

Also, the whale optimization module 210 strictly maintains, $\vec{A}$ in the range [−1,1]. The highest and lowest values of the vector $\vec{A}$ signifies that the position of new search agents generated in each iteration always lie within the encircle that is formed in the first iteration and move towards the optimal solution. The whale optimization module 210 defines this procedure as the exploitation phase of whale optimization algorithm in determining an optimal global solution. The whale optimization module 210 further includes an exploration phase of whale optimization algorithm, which includes the range of the values of the coefficient vector $\vec{A}$ as $2 \geq |\vec{A}| > 1$. As such, the updated locations of the search agents, in this case, are mathematically modeled by Equations (13) and (14) as provided below:

$$\vec{X}(t+1) = \vec{X_{rand}} - \vec{A} \cdot \vec{D} \quad (13)$$

$$\vec{D} = |\vec{C} \cdot \vec{X_{rand}} - \vec{X}| \quad (14)$$

where, the whale optimization module 210 is configured to arbitrarily select the position vector $\vec{X_{rand}}$ from the current populations/search agents.

Based upon the whale optimization algorithm, the whale optimization module 210 is configured to generate an optimized pair of parameter values (K and $T_1$). This is further illustrated with an example over the data provided in Table 1. Based upon the data set provided in Table 1, followed by clustering the data set and using the DL module 208 over the clustered data set, the parameters of the whale optimization algorithm models is tuned using a continuously controlled trial-and-error approach for the power system network 100 and the power system network 100A, as provided in Table 2 below.

TABLE 2

| | | SPI values of the proposed WOA-DL models | | | | | | |
|---|---|---|---|---|---|---|---|---|
| | Parameters | RMSE | MAE | MAPE | RSR | PBIAS | $R^2$ | WIA |
| K | Without UPFC | 0.1674 | 0.1109 | 0.0048 | 0.0260 | 0.1078 | 0.9996 | 0.9998 |
| | With UPFC | 0.0668 | 0.0486 | 0.0017 | 0.0227 | 0.0259 | 0.9974 | 0.9998 |
| $T_1$ | Without UPFC | 0.0024 | 0.0015 | 0.0056 | 0.0484 | −0.0664 | 0.9988 | 0.9994 |
| | With UPFC | 0.0005 | 0.0003 | 0.0003 | 0.064 | −0.0015 | 0.9980 | 0.9989 |

The whale optimization module 210 is further configured to identify statistical performance indicators such as RMSE, MAPE, RSR, R2, and WIA for both networks. Based upon plurality of optimization techniques, the whale optimization module 210 generates an optimized pair of parameters values (K and $T_1$).

As an example, considering plurality of data sets from the power system network 100 and the power system network 100A as provided in Table 1 and employing the DL module 208 over the clustered data set and using the whale optimization module 210 to identify the optimized pair of parameter values (K and $T_1$) is illustrated in FIG. 4A, FIG. 4B, FIG. 4C, FIG. 4D, FIG. 5A, FIG. 5B, FIG. 5C, and FIG. 5D.

Figure 4A:
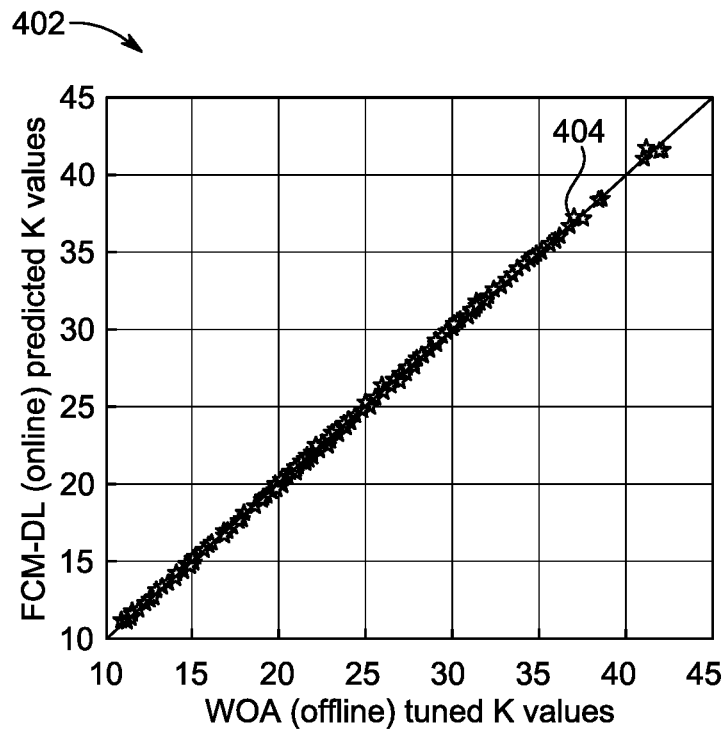
FIG. 4A shows a graphical representation illustrating a whale optimized algorithm scatter regression plot of the first power system network for computed network gain parameter (K) concerning the actual adjusted values, according to certain embodiments.

FIG. 4A shows a graphical representation 402 illustrating a whale optimized algorithm scatter regression plot of the power system network 100 for the computed network gain parameter (K) concerning the actual optimized values, according to an embodiment. The real value of the network gain parameter (K) was computed offline and is shown on X axis, while the optimized value of the gain was computed using the whale optimization module 210 in real-time and is shown on Y axis. Furthermore, curve 404 indicates that the computed optimized value of the network gain parameter (K) is virtually equal to the actual value of the network gain parameter (K). This indicates that the LFO mitigation system 200 is able to easily identify the real-time optimized value of the network gain parameter (K) for the power system network 100.

Figure 4B:
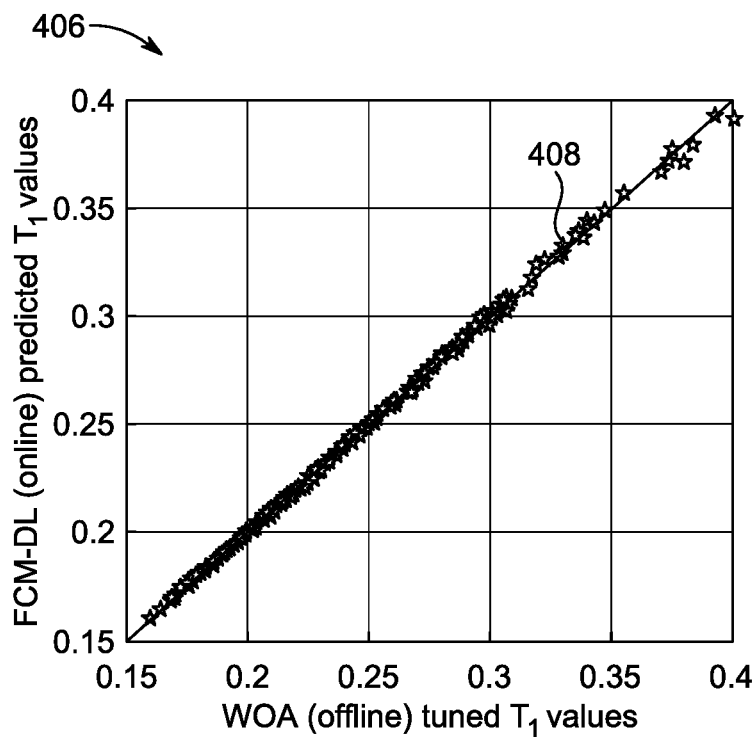
FIG. 4B shows a graphical representation illustrating a whale optimized algorithm scatter regression plot of the first power system network for computed time constant parameter ($T_1$) concerning the actual adjusted values, according to certain embodiments.

FIG. 4B shows a graphical representation 406 illustrating a whale-optimized algorithm scatter regression plot of the power system network 100 for the computed time constant parameter ($T_1$) concerning the actual optimized values, according to an embodiment. The real values of time constant parameter ($T_1$) were computed offline and is shown on X axis, while the optimized value of the time constant parameters i.e., $T_1$ was computed using the whale optimization module 210 in real-time and is shown on Y axis. Furthermore, curve 408 indicates that the computed optimized value of the time constant parameter ($T_1$) is virtually equal to the actual value of the time constant parameter ($T_1$). This again indicates that the LFO mitigation system 200 is able to easily identify the real-time optimized value of the time constant parameter ($T_1$) for the power system network 100.

Figure 4C:
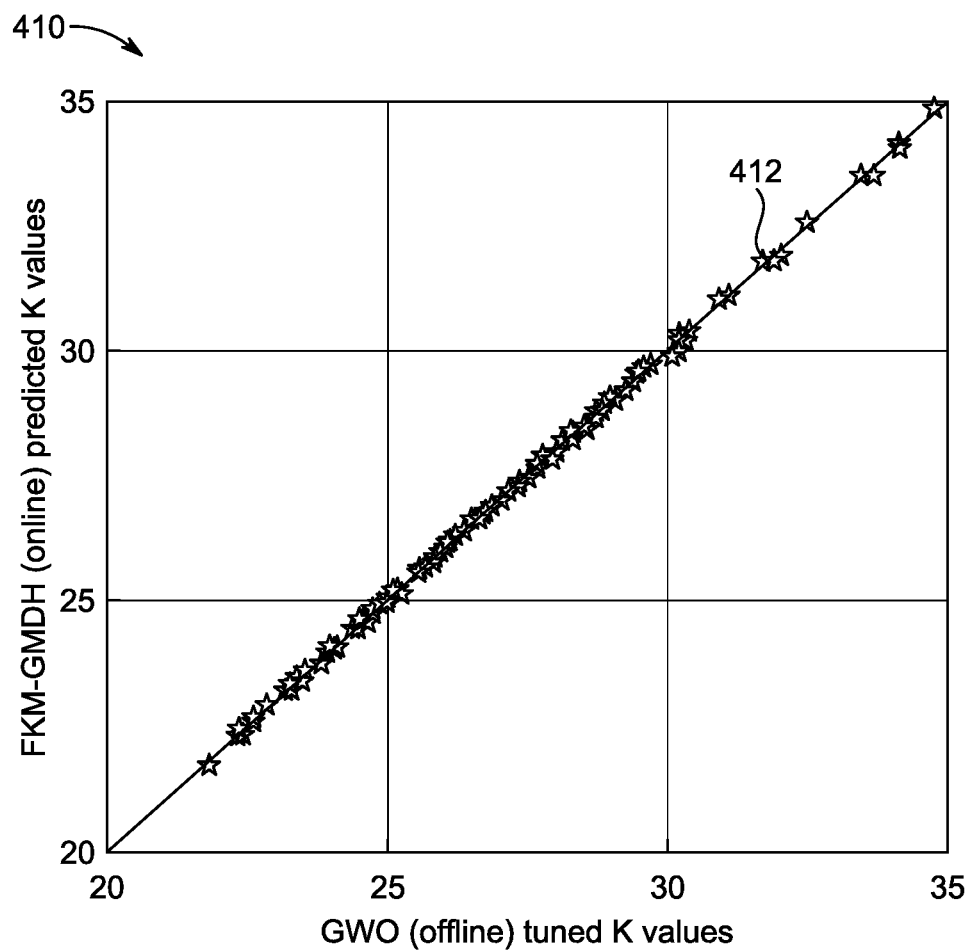
FIG. 4C illustrates a graphical representation of a whale-optimized algorithm scatter regression plot of the second power system network for the computed network gain parameter (K) concerning the actual optimized values, according to certain embodiments.

FIG. 4C illustrates a graphical representation 410 illustrating a whale optimized algorithm scatter regression plot of the power system network 100A for the computed network gain parameter (K) concerning the actual optimized values, according to an embodiment. The real values of the gain (K) were again computed offline and are shown on X axis, while the optimized value of the gain was computed using the whale optimization module 210 in real-time and is shown on Y axis. Furthermore, curve 412 indicates that the computed optimized value of the network gain parameter (K) is again virtually equal to the actual value of the network gain parameter (K). This indicates that the LFO mitigation system 200 is enabled to identify the real-time optimized value of the network gain parameter (K) for the power system network 100A.

Figure 4D:
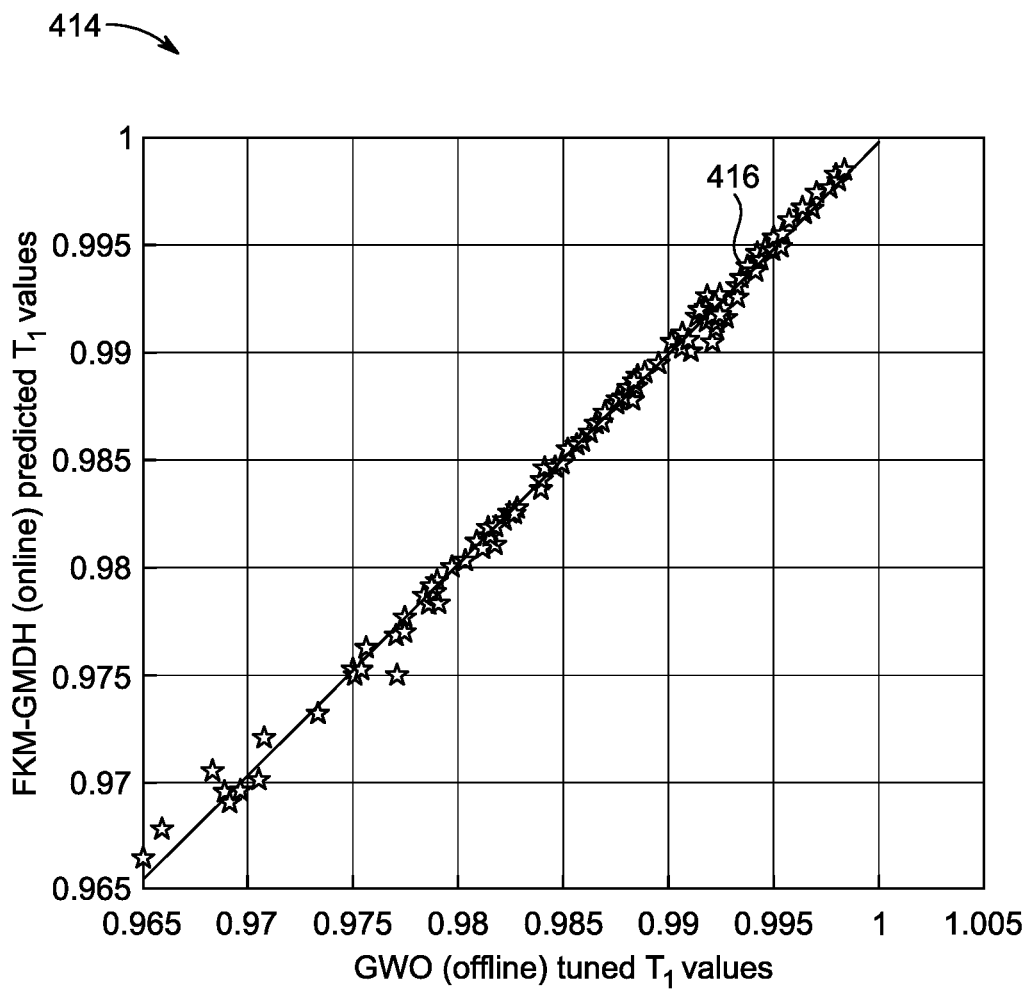
FIG. 4D shows a graphical representation illustrating a whale-optimized algorithm scatter regression plot of the second power system network for the computed time constant parameters ($T_1$) concerning the actual adjusted values, according to certain embodiments.

FIG. 4D shows a graphical representation 414 illustrating a whale-optimized algorithm scatter regression plot of the power system network 100A for the computed time constant parameters ($T_1$) concerning the actual optimized values, according to an embodiment. The real values of time constant parameters ($T_1$) were computed offline and are shown on X axis, whereas the optimized value of the time constant parameter ($T_1$) was computed using the whale optimization module 210 in real-time and is shown on Y axis. Furthermore, curve 416 indicates that the computed optimized value of the time constant parameter ($T_1$) is virtually equal to the actual value of the time constant parameter ($T_1$). This again indicates that the LFO mitigation system 200 is enabled to identify the real-time optimized value of the time constant parameter ($T_1$) for the power system network 100A.

Figure 5A:
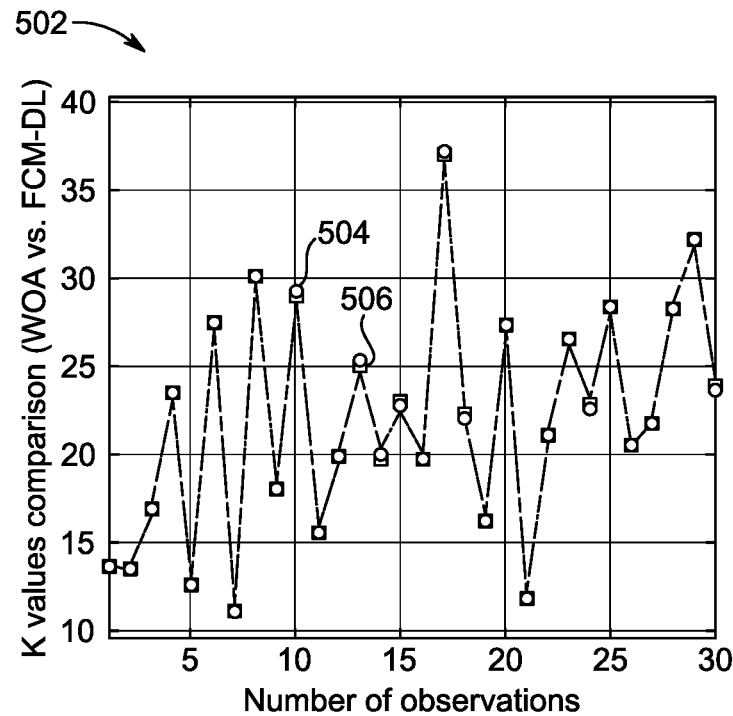
FIG. 5A shows a graphical representation illustrating projected and estimated values of network gain parameter (K) for the first power system network under a plurality of distinct operating and loading conditions, according to certain embodiments.

FIG. 5A shows a graphical representation 502 illustrating projected and estimated values of the network gain parameter (K) for the power system network 100 under a plurality of distinct operating and loading conditions, according to an embodiment. The actual values of the gain (K) were obtained offline, and the computed value of the gain (K) was obtained in real-time using the output of the whale optimization module 210. The X axis indicates the number of observations, while the Y axis indicates a comparison of K values computed in real-time. In FIG. 5A, plot 504 indicates the real-time computed value of the gain (K) using the output of the whale optimization module 210 and plot 506 indicates offline computed values of the network gain parameter (K). The plots indicate that the LFO mitigation system 200 is enabled to identify the real-time optimized value of the network gain parameter (K) for the power supply network 100.

Figure 5B:
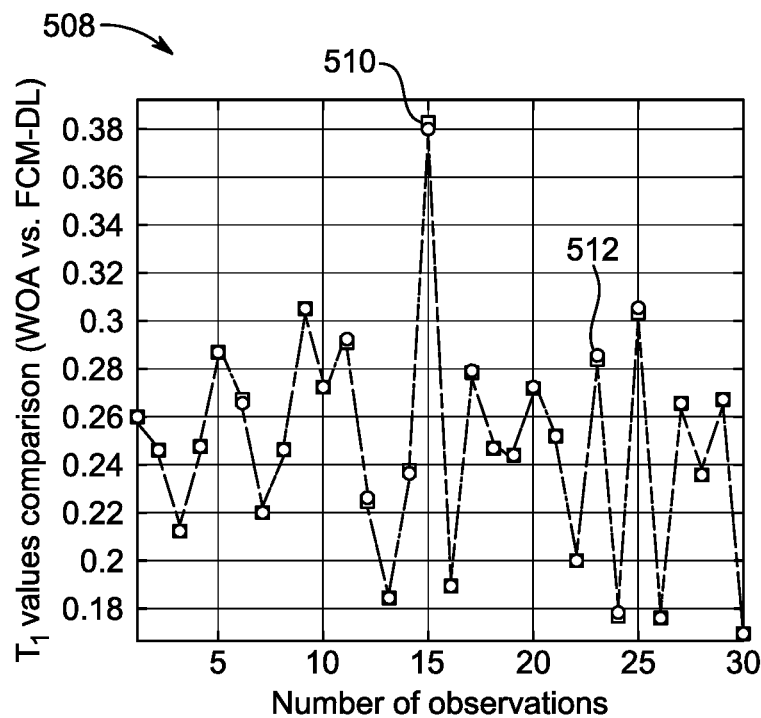
FIG. 5B shows a graphical representation illustrating projected and estimated values of the time constant parameter ($T_1$) for the first power system network under a plurality of distinct operating and loading conditions, according to certain embodiments.

FIG. 5B shows a graphical representation 508 illustrating projected and estimated values of the time constant parameter ($T_1$) for the power system network 100 under a plurality of distinct operating and loading conditions, according to an embodiment. The true value of the time constant parameter ($T_1$) was computed offline, and the value of the time constant parameter ($T_1$) was computed in real-time using the output of the whale optimization module 210. The X axis indicates the number of observations, while the Y axis indicates a comparison of time constant parameter ($T_1$) computed in real-time. As shown in FIG. 5B, plot 510 indicates offline computed values of the time constant parameter ($T_1$) and plot 512 indicates the real-time computed value of the time constant parameter ($T_1$) using the output of the whale optimization module 210. The plots again indicates that the LFO mitigation system 200 is enabled to identify the real-time optimized value of the time constant parameter ($T_1$) for the power system network 100.

Figure 5C:
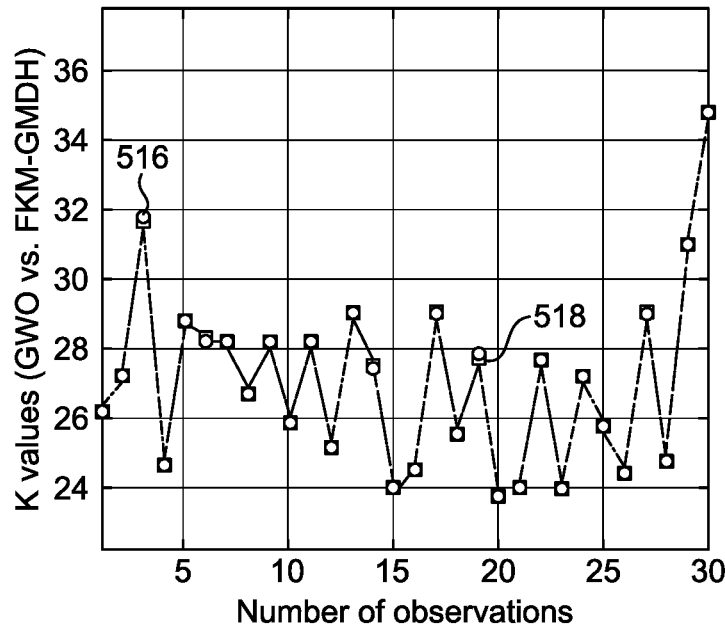
FIG. 5C shows a graphical representation illustrating the projected and estimated values of network gain parameter (K) for the second power system network under a plurality of distinct operating and loading conditions, according to certain embodiments.

FIG. 5C shows a graphical representation 514 illustrating the projected and estimated values of network gain parameter (K) for the power system network 100A under a plurality of distinct operating and loading conditions, according to an embodiment. The true values of the gain (K) were obtained offline, and the computed value of the gain (K) was obtained in real-time using the output of the whale optimization module 210. The X axis indicates the number of observations, while the Y axis indicates a comparison of K values computed in real-time. In FIG. 5C, plot 516 indicates the real-time computed value of the network gain parameter (K) using the output of the whale optimization module 210 and plot 518 indicates offline computed values of the network gain parameter (K). The plots indicate that the LFO mitigation system 200 is enabled to identify the real-time optimized value of the network gain parameter (K) for the power system network 100.

Figure 5D:
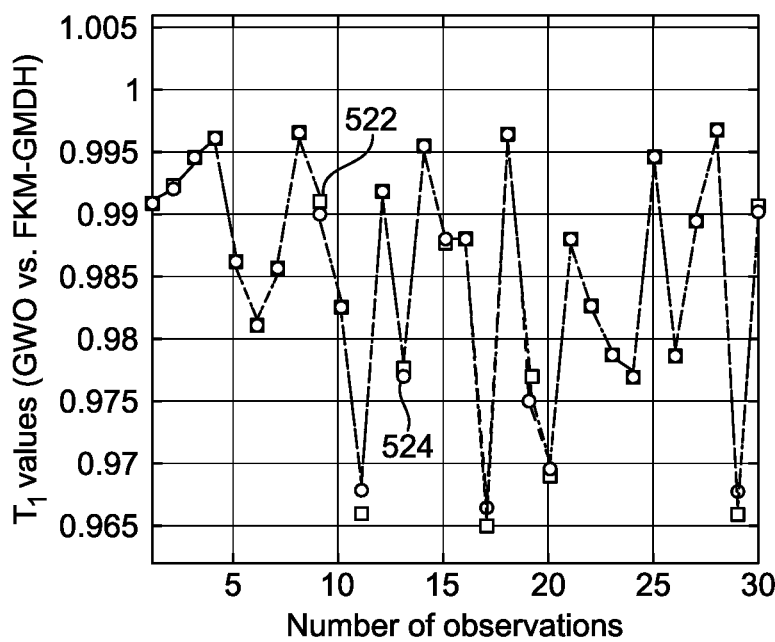
FIG. 5D shows a graphical representation illustrating projected and estimated values of time constant parameter ($T_1$) for the second power system network under plurality of distinct operating and loading conditions, according to certain embodiments.

FIG. 5D shows a graphical representation 520 illustrating projected and estimated values of the time constant parameter ($T_1$) for the power system network 100A under plurality of distinct operating and loading conditions, according to an embodiment. The true values of the time constant parameter ($T_1$) were computed offline, and the computed value of the time constant parameter ($T_1$) was obtained real-time using the output of the whale optimization module 210. The X axis again indicates the number of observations, while the Y axis indicates a comparison of time constant parameter ($T_1$) computed in real-time. As shown in FIG. 5D, plot 522 indicates offline computed values of the time constant parameter ($T_1$) and plot 524 indicates the real-time computed value of the time constant parameter ($T_1$) using the output of the whale optimization module 210. The plots indicates that the LFO mitigation system 200 is able to easily identify the real-time optimized value of the time constant parameter ($T_1$) for the power system network 100.

Surprisingly and unexpectedly, it was experimentally observed that under 700 randomly generated operating conditions, the LFO mitigation system 200 estimated the PSS parameters of the power system network 100 in about 0.285s, in conjugation with FIG. 4A, FIG. 4B, FIG. 4C, FIG. 4D, FIG. 5A, FIG. 5B, FIG. 5C, and FIG. 5D. Consequently, the PSS parameters for one operating scenario were, surprisingly and unexpectedly, calculated using the recommended model in about 0.000407 seconds. In the present embodiments, the LFO mitigation system 200 needed 0.30 s to establish UPFC synchronized PSS keys for a subsequent test system's additional 700 load scenarios. A single loading condition took an average of 0.000429 seconds to complete. Estimating PSS characteristics using the LFO mitigation system 200 models takes around 35 times longer than 60 Hz electricity. As a result, the LFO mitigation system 200 responds faster, allowing the PSS parameters to be computed and optimized in real time.

Referring back to FIG. 1 and FIG. 2, once the whale optimization module 210 generate an optimized pair of parameter values (i.e. K and $T_1$), the optimized pair of parameter values is provided to the PSS 102 and the PSS 102A coupled to the power system network 100 and the power system network 100A, respectively, for mitigation of low-frequency oscillations of the power supply network 100 and the power system network 100A. As such, due to system disturbance or fluctuation due to sudden electricity demand in the power supply network 100 and the power system network 100A, the optimized pair of parameters (K and $T_1$) is computed in real-time using the LFO mitigation system 200 that is provided to the power system network 100 or the power system network 100A for real-time mitigation from the LFO.

Experimental Results

The effectiveness of the LFO mitigation system 200 in computing the pair of parameters (K, $T_1$) for the PSS 102 for the power supply network 100 in real-time was experimentally evaluated using three loading conditions. For example, the three loading conditions (including first loading condition (LC #1), second loading condition (LC #2), and third loading condition (LC #3) for the power system network 100 are provided in Table 3, as below:

TABLE 3

Key PSS parameters for three distinct scenarios of the power system network 100

| Loading conditions | $P_e$ (pu) | $Q_e$ (pu) | $V_t$ (pu) |
|---|---|---|---|
| Loading condition (LC) # 1 | 0.6000 | 0.0100 | 0.9800 |
| Loading condition (LC) # 2 | 0.9545 | 0.2757 | 1.0311 |
| Loading condition (LC) # 3 | 0.8942 | −0.2809 | 0.9554 |

Experimental Observation Over the First Loading Condition (LC #1) on the Power Supply Network 100 Based Upon Eigenvalues and MDR Analysis The first loading condition (LC #1) was provided as a data set of real power ($P_e$), reactive power ($Q_e$), and the terminal voltage ($V_t$) across the PSS 102 to the FCM clustering module 206 of the LFO mitigation system 200. After clustering the data set into a plurality of clusters, the data set was provided to the DL module 208 where, based upon the learning and training of the deep learning module, the DL module 208 identifies the relevant eigenvalues, minimum damping ratio, network gain parameter s, and time constant parameters for the first loading scenarios (LC #1). To determine the value of the optimized parameter, these values are further employed in the whale optimization module 210 to determine the optimized value of all these parameters. The LFO mitigation system 200 further receives a pair of predetermined parameter values of the power system network 100 or the power system network 100A, at which the power system network 100 or 118 has zero low-frequency oscillations with the said values.

Based upon the FCM clustering module 206, DL module 208 and the whale optimization module 210, the LFO mitigation system 200 identifies eigenvalues, MDR values, and pair of parameter values (K, $T_1$) for the reference value of predetermined pair of parameters as well as eigenvalues, MDR values, pair of parameter values (K, $T_1$) of the data sets from the voltage, real power, and reactive power for the first loading conditions of the power supply network 100. The same is shown in Table 4, as below:

Study A: M. I. H. Pathan, M. J. Rana, M. S. Shahriar, M. Shafiullah, M. H. Zahir, and A. Ali, "Real-time LFO damping enhancement in electric networks employing PSO optimized ANFIS," Inventions, vol. 5, no. 4, pp. 1-21, 2020, doi: 10.3390/inventions5040061.

For comparison, Eigenvalues, MDR values, K and $T_1$ values of the first loading condition are also computed from the other convention methods, as shown in Table 4.

As shown in Table 4, the stated eigenvalues for all of the techniques were discovered on the left half-plane, which guarantees the stable operation of the power system network 100. On the other hand, the whale optimization and clustering-based DL model on the LFO mitigation system 200 performed better on the power system network 100 than the conventional system in terms of Eigenvalue placement. Furthermore, the MDR of the reference and produced whale optimization and clustering based DL model was higher than the traditional model, showing that whale optimization and clustering-based DL model is more effective at damping the LFO and achieving superior stability than the old model published in the art. Further, the whale optimization and clustering based DL model was found to have much larger network gain parameter s and lower time constant parameter for the first loading scenarios.

Experimental Observation Over the Second Loading Condition (LC #2) and the Third Loading Condition (LC #3) on the Power System Network 100

The second loading condition (LC #2) and the third loading condition (LC #3) as provided in Table 4 was separately provided as a data set of real power ($P_e$), reactive power ($Q_e$), and the terminal voltage ($V_t$) across the PSS 102 to the FCM clustering module 206 of the LFO mitigation system 200. After clustering the data set into a plurality of clusters, the data set was provided to the DL module 208 where, based upon the previous training of the deep learning module, the DL module 208 identifies the relevant eigenvalues, minimum damping ratio, network gain parameter s, and time constant parameters for the second loading condition (LC #2) and the third loading condition (LC #3), respectively.

Based upon the FCM clustering module 206, the DL module 208, and the whale optimization module 210, the LFO mitigation system 200 identifies Eigenvalues, MDR values, pair of parameter values (K, $T_1$) for the reference value of predetermined pair of parameters as well as Eigenvalues, MDR values, pair of parameter values (K, $T_1$) of the data sets from the voltage, real power, and reactive power of the first loading condition of the power system network 100. The same is shown in Table 5 and Table 6 for the second loading condition and the third loading condition, as below:

TABLE 3

Comparison of key parameters for first loading condition

| Parameters | FCM-DL | Study A (Reference) | Conventional |
|---|---|---|---|
| Eigenvalues | −0.349 | −0.346 | −0.336 |
| | −17.512 | −18.206 | −17.516 |
| | −3.100 ± 4.8514i | −2.928 ± 5.386i | −0.885 ± 4.179i |
| | −3.233 ± 5.588i | −3.061 ± 5.653i | −5.452 ± 6.834i |
| MDR | 0.507 | 0.476 | 0.207 |
| K | 26.707 | 18.365 | 7.090 |
| $T_1$ | 0.223 | 0.263 | 0.685 |

TABLE 5

Comparison of key parameters for the second loading condition

| Parameters | FCM-DL | Study A (Reference) | Conventional |
|---|---|---|---|
| Eigenvalues | −0.357 | −0.342 | −0.338 |
| | −17.694 | −18.508 | −18.379 |
| | −3.023 ± 4.531i | −2.801 ± 5.58i | −0.621 ± 3.595i |
| | −3.215 ± 5.117i | −3.038 ± 5.653i | −5.284 ± 7.414i |
| MDR | 0.519 | 0.533 | 0.170 |
| K | 25.742 | 25.639 | 7.090 |
| $T_1$ | 0.194 | 0.194 | 0.685 |

TABLE 4

Comparison of key parameters for the third loading condition

| Parameters | FCM-DL | Study A (Reference) | Conventional |
|---|---|---|---|
| Eigenvalues | −0.349 | −0.358 | −0.337 |
|  | −17.284 | −17.673 | −19.123 |
|  | −3.114 ± 4.791i | −2.968 ± 4.709i | −4.040 ± 7.550i |
|  | −3.303 ± 5.555i | −3.281 ± 4.927i | −1.493 ± 4.408i |
| MDR | 0.511 | 0.448 | 0.320 |
| K | 38.424 | 13.526 | 7.090 |
| $T_1$ | 0.216 | 0.325 | 0.685 |

As shown in Table 5 and Table 6, similar performances were again observed. The eigenvalues for all of the techniques were discovered on the left half-plane, which guarantees the stable operation of the power system network 100. On the other hand, the whale optimization and clustering based DL model on the LFO mitigation system 200 performed better on the power system network 100 than the conventional system in terms of Eigenvalue placement. Furthermore, the MDR of the reference and the produced whale optimization and clustering based DL model was higher than the traditional model, showing that whale optimization and clustering based DL model is more effective at damping the LFO and achieving superior stability than the conventional model published in the art. Further, the whale optimization and clustering based DL model was found to have much larger network gain parameter and lower time constant parameters for the first loading scenarios.

Experimental Observation Over Time-Domain Simulation with Disturbance on the Power System Network 100 Based Upon the Third Loading Condition (LC #3)

Figure 6A:
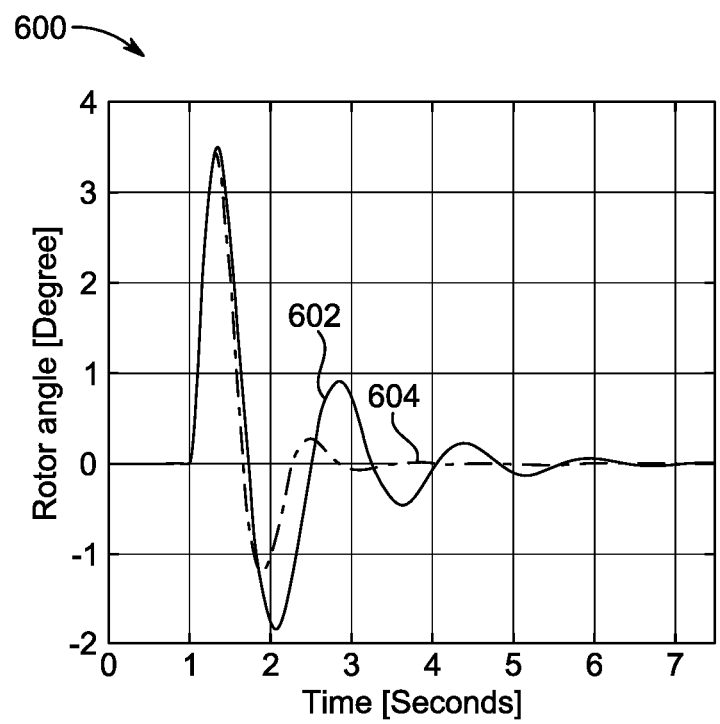
FIG. 6A shows a graphical representation illustrating a response of the first power system network in terms of change in rotor angle due to external disturbance, according to certain embodiments.

FIG. 6A shows a graphical representation 600 illustrating response of the power system network 100 in terms of change in rotor angle due to external disturbance, according to an embodiment. The performance of the LFO mitigation system 200 in dampening the LFO under external disturbance was observed using the time domain simulation with disturbance on the power system network 100 on the third loading condition. To create a disturbance to the input, 10% additional mechanical torque was injected every 1.0 s for four cycles, and the response of the LFO mitigation system 200 was analyzed. It was found that LFO mitigation system 200 and models in previous studies nullified the LFO from the power system network 100 and stabilized the power system network 100. However, the whale optimization and clustering-based DL model in the LFO mitigation system 200 responded faster than the previously studied models. In FIG. 6A, the X axis represents time, and Y axis represents the rotor angle in degree. Further, curve 604 represents a response through the whale optimization and clustering-based DL model in the LFO mitigation system 200, and curve 602 illustrates response through other convention method of removing the LFO. Experimentally, it was observed that curve 602 for the conventional model settled in 6.0 seconds compared to curve 604 which settled in 3.5 seconds. This indicates a faster response through the whale optimization and clustering based DL model in the LFO mitigation system 200.

Figure 6B:
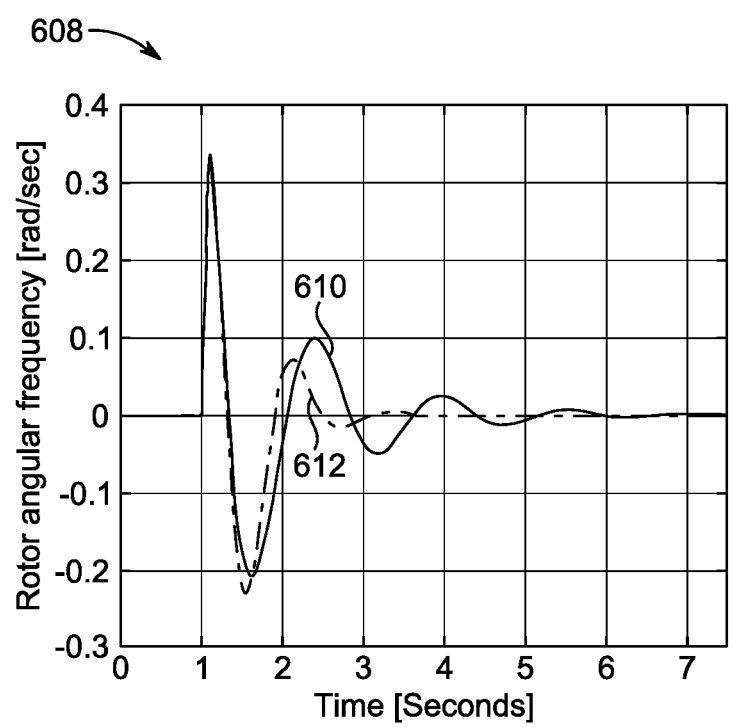
FIG. 6B shows a graphical representation illustrating a response of the first power system network in terms of change in angular frequency due to external disturbance, according to certain embodiments.

FIG. 6B shows a graphical representation 608 illustrating response of the power system network 100 in terms of change in angular frequency due to external disturbance, according to an embodiment. To analyze the effect of disturbance over the change in angular frequency of the power system network 100, a disturbance was created to the input, and again 10% additional mechanical torque was injected every 1.0 s for four cycles, and the response of the LFO mitigation system 200 was analyzed. In FIG. 6B, the X axis represents time, and the Y axis represents rotor angular frequency. It was again found that although the LFO mitigation system 200, as well as models in previous studies, both nullified the LFO from the power system network 100 and stabilized the power system network 100, the whale optimization and clustering based DL model in the LFO mitigation system 200 responded faster than the previous studied models. For example, curve 612 represents a response through the whale optimization and clustering based DL model in the LFO mitigation system 200. Curve 610 represents a response through other conventional methods of removing the LFO. Experimentally it was observed that the curve 610 for the conventional model settles later than the curve 612. This indicates a faster response through the whale optimization and clustering based DL model in the LFO mitigation system 200.

In conclusion, considering FIG. 6A and FIG. 6B, according to all calculations, the whale optimization and clustering based DL model in the LFO mitigation system 200 stabilized the power system states. Further the whale optimization and clustering based DL model in the LFO mitigation system 200 successfully eliminated the LFO in real-time PSS parameter estimation in the power system network 100.

The effectiveness of the LFO mitigation system 200 in computing the pair of parameters (K, $T_1$) for the PSS 102A for the power system network 100A in real-time was experimentally evaluated using three different loading conditions including light loading (LL), normal loading (NL), and heavy loading (HL). The light loading, the normal loading, and the heavy loading may interchangeably be referred to as the first loading condition, the second loading condition, and the third loading condition, respectively. For example, the three loading conditions for the power system network 100A are provided in Table 7, as below:

TABLE 5

Key PSS parameters for three distinct scenarios of the power system network 100A

| Loading conditions | $P_e$ (pu) | $Q_e$ (pu) | $V_t$ (pu) |
|---|---|---|---|
| Light loading (LL) | 0.60 | 0.01 | 0.98 |
| Nominal loading (NL) | 0.98 | −0.16 | 1.00 |
| Heavy loading (HL) | 1.30 | 0.40 | 1.06 |

Experimental Observation Over the First Loading Condition (Light Loading) on the Power System Network 100A Based Upon Eigenvalues and MDR Analysis.

The first loading condition was provided as a data set of real power ($P_e$), reactive power ($Q_e$), and the terminal voltage ($V_t$) across the PSS 102A to the FCM clustering module 206 of the LFO mitigation system 200. After clustering the data set into plurality of clusters, the data set was provided to the DL module 208 where, based upon the previous training of the deep learning module, the DL module 208 identifies the relevant eigenvalues, minimum damping ratio, network gain parameters, and time constant parameters for the first loading scenario. To identify the value of optimized parameter, these values are further employed to the whale optimization module 210 to identify the optimized value of all these parameters. The LFO mitigation system 200 further receives a pair of predetermined parameter values of the power system network 100 or the power system network 100A at which the power system network 100 or the power system network 100A has zero low-frequency oscillations with the said values.

Based upon the FCM clustering module 206, the DL module 208, and the whale optimization module 210, the LFO mitigation system 200 identified Eigenvalues, MDR values for the reference value of predetermined pair of parameters as well as Eigenvalues, MDR values, pair of parameter values (K, $T_1$) of the data sets from the voltage, real power, and reactive power of the first loading condition (i.e., the light loading) of the power system network 100A. The same is also represented in Table 8, as below:

TABLE 8

Comparison of key parameters for light loading

| Parameters | FCM-DL | Study A (Reference) | Conventional |
|---|---|---|---|
| Eigenvalues | −0.391 | −0.199 | −0.399 |
| | −1.398 | −0.1683 | −6.593 |
| | −83.492 | −80.806 | −87.562 |
| | −126.873 | −125.131 | −110.031 |
| | −977.808 | −982.232 | −993.511 |
| | −1.322 ± 0.029i | −1.248 ± 0.136i | −0.614 ± 3.968i |
| | −4.076 ± 2.848i | −4.059 ± 3.673i | −0.718 ± 0.295i |
| MDR | 0.819 | 0.741 | 0.153 |
| K | 25.588 | 24.005 | 15 |
| $T_1$ | 0.984 | 0.984 | 0.5 |

For comparison, Eigenvalues, MDR values, K and $T_1$ values of the first loading condition is also computed from the other convention methods (shown in Table 8).

As shown in Table 8, the eigenvalues for all of the techniques were again discovered on the left half-plane, which again guaranteed the stable operation of the power system network 100A. Since the related eigenvalues were placed further away from the imaginary axis, the whale optimization and clustering based DL model were found to be more stable than the conventional system and comparable to the power system network 100A. Furthermore, the MDR of the reference and the whale optimization and clustering based DL model was again higher than the traditional model, showing that whale optimization and clustering based DL model was more effective at damping the LFO and achieving superior stability than the conventional model published in the art.

Experimental Observation Over the Second Loading Condition (Nominal Loading) and the Third Loading Condition (Heavy Loading) on the Power System Network 100A The second loading condition and the third loading condition as provide in Table 7 was separately provided as a data set of real power ($P_e$), reactive power ($Q_e$), and the terminal voltage ($V_t$) across the PSS 102A to the FCM clustering module 206 of the LFO mitigation system 200. After clustering the data set into a plurality of clusters, the data set was provided to the DL module 208 where, based upon the learning and training of the deep learning module, the DL module 208 identifies the relevant eigenvalues, minimum damping ratio, network gain parameter s, and time constant parameters for the second loading scenario and the third loading scenario.

Based upon the FCM clustering module 206, the DL module 208, and the whale optimization module 210, the LFO mitigation system 200 identifies Eigenvalues, MDR values for the reference value of predetermined pair of parameters as well as Eigenvalues, MDR values, pair of parameter values (K, $T_1$) of the data sets from the voltage, real power and reactive power of the first loading condition of the power system network 100A. The same is also represented in Table 9 and Table 10 for the second loading condition and the third loading conditions.

TABLE 9

Comparison of key parameters for nominal loading

| Parameters | FCM-DL | Study A (Reference) | Conventional |
|---|---|---|---|
| Eigenvalues | −0.199 | −0.391 | −0.205 |
| | −1.651 | −1.466 | −6.694 |
| | −80.810 | −83.494 | −86.497 |
| | −125.114 | −126.867 | −110.704 |
| | −982.347 | −977.816 | −994.470 |
| | −1.265 ± 0.082i | −1.291 ± 0.078i | −0.418 ± 4.609i |
| | −4.054 ± 3.670i | −4.0744 ± 2.847 | −0.676 ± 0.319i |
| MDR | 0.741 | 0.820 | 0.090 |
| K | 23.954 | 25.583 | 15 |
| $T_1$ | 0.985 | 0.983 | 0.5 |

TABLE 10

Comparison of key parameters for heavy loading under PSS 102A only

| Parameters | FCM-DL | Study A (Reference) | Conventional |
|---|---|---|---|
| Eigenvalues | −0.142 | −0.141 | −0.147 |
| | −1.179 | −1.063 | −7.268 |
| | −82.384 | −81.860 | −87.047 |
| | −137.891 | −142.793 | −112.996 |
| | −966.536 | −961.396 | −991.096 |
| | −1.379 ± 0.450i | −1.009 ± 0.781i | −0.426 ± 4.800i |
| | −4.974 ± 3.294i | −5.746 ± 3.741i | −0.676 ± 0.273i |
| MDR | 0.833 | 0.791 | 0.088 |
| K | 27.684 | 31.873 | 15 |
| $T_1$ | 0.989 | 0.986 | 0.5 |

As shown in Table 9 and Table 10, similar performance was observed. The stated eigenvalues for all of the techniques were discovered on the left half-plane, which guaranteed the stable operation of the power system network 100. On the other hand, the whale optimization and clustering based DL model on the LFO mitigation system 200 performed better on the power system network 100A than the conventional system in terms of Eigenvalue placement. Furthermore, the MDR of the reference and produced proposed models was higher than the conventional model, showing that whale optimization and clustering based DL model is more effective at damping the LFO and achieving superior stability than the conventional model. Experimental observation over time-domain simulation with disturbance on the second test power system 118 based upon the third loading condition (HL)

Figure 6C:
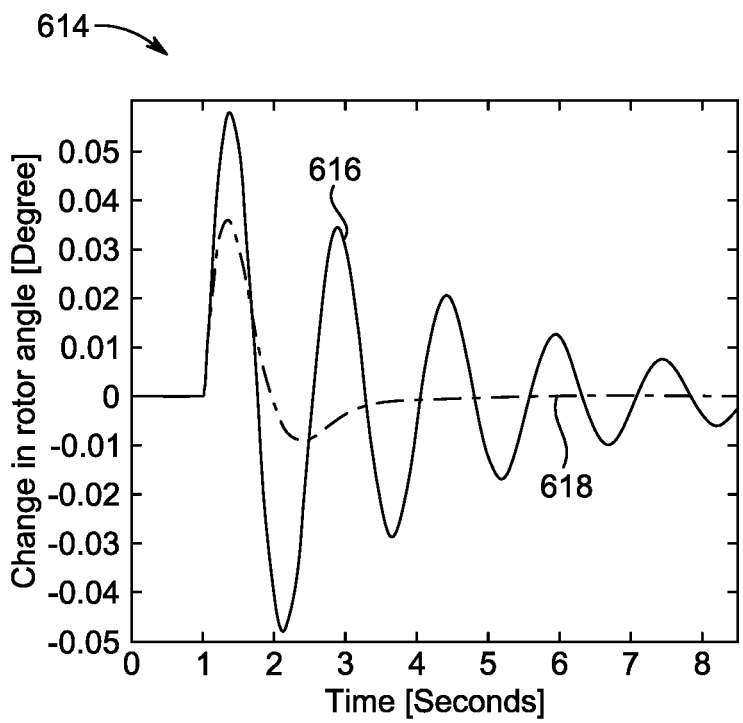
FIG. 6C shows a graphical representation illustrating a response of the second power system network in terms of change in rotor angle due to external disturbance, according to certain embodiments.

FIG. 6C shows a graphical representation 614 illustrating a response of the power system network 100A in terms of change in rotor angle due to external disturbance, according to an embodiment. The performance of the LFO mitigation system 200 in dampening the LFO under the external disturbance was observed using the time domain simulation with disturbance on the power system network 100A on the third loading condition. To create a disturbance to the input, 10% additional mechanical torque was again injected every 1.0 s for four cycles and the response of the LFO mitigation system 200 was analyzed, same as in case with the power system network 100. It was found that the LFO mitigation system 200 as well as conventional models both nullified the LFO from the power system network 100 and stabilize the power system network 102A. However, the whale optimization and clustering based DL model in the LFO mitigation system 200 again responded faster than the conventional models. For example, curve 618 represents a response through the whale optimization and clustering based DL model in the LFO mitigation system 200, and curve 616 represents response through other conventions method of removing the LFO. The X axis represents time, while the Y axis represents change in the rotor angle in degree. Experimentally it was observed that the curve 616 for the conventional model settled in 7.0 seconds compared to the curve 614 that settled in 3.5 seconds. This indicated a faster response through the whale optimization and clustering based DL model in the LFO mitigation system 200.

Figure 6D:
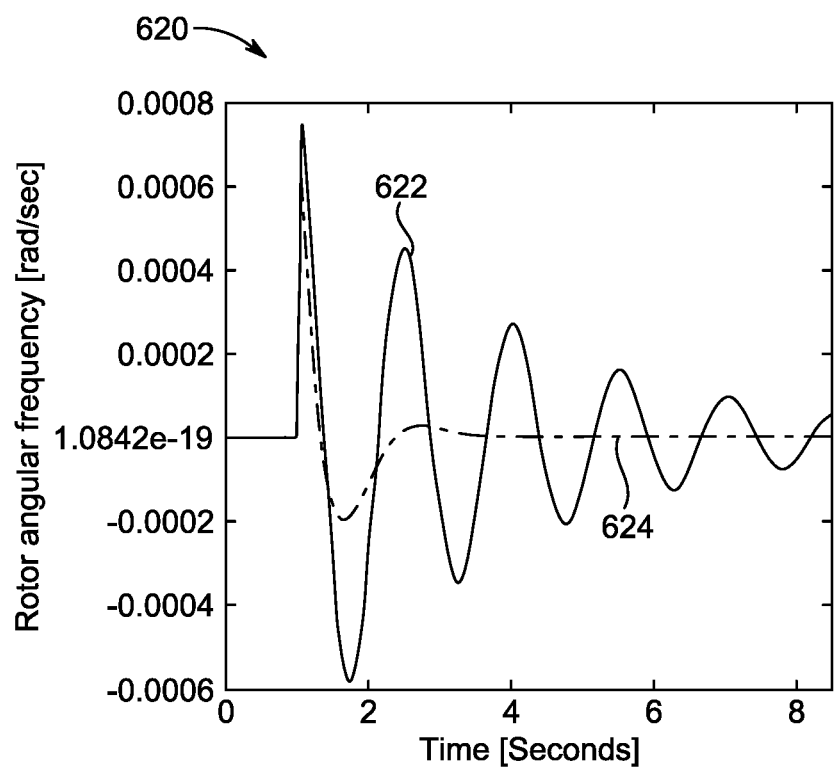
FIG. 6D shows a graphical representation illustrating a response of the second power system network in terms of change in angular frequency due to external disturbance, according to certain embodiments.

FIG. 6D shows a graphical representation 620 illustrating a response of the power system network 100A in terms of change in angular frequency due to external disturbance, according to an embodiment. To analyze the effect of disturbance over change in angular frequency of the power system network 100A, a disturbance was again created to the input, and again 10% additional mechanical torque was injected every 1.0 s for four cycles and the response of the LFO mitigation system 200 was analyzed. It was again found that although the LFO mitigation system 200 as well as conventional models both nullified the LFO from the power system network 100A and stabilized the power system network 100A, the whale optimization and clustering based DL model in the LFO mitigation system 200 responded faster than the conventional models. For example, curve 624 represents a response through the whale optimization and clustering based DL model in the LFO mitigation system 200 and curve 622 represents a response through other conventions method of removing the LFO. The X axis represents time, while the Y axis represents change in the rotor angle frequency. Experimentally it was again observed that the curve 622 for the conventional model settles later than the curve 624. This again indicated a faster response through the whale optimization and clustering based DL model in the LFO mitigation system 200 even for the power system network 100A.

In conclusion, considering FIG. 6C and FIG. 6D, according to all calculations, the whale optimization and clustering based DL model in the LFO mitigation system 200 stabilized the power system states. Further the whale optimization and clustering based DL model in the LFO mitigation system 200 successfully eliminated the LFO in real-time PSS parameter estimation in the power system network 100A.

In an aspect, the effectiveness of the LFO mitigation system 200 over the power system network 100A in respect of DC-link voltage was compared to the conventional tuned model.

Figure 7:
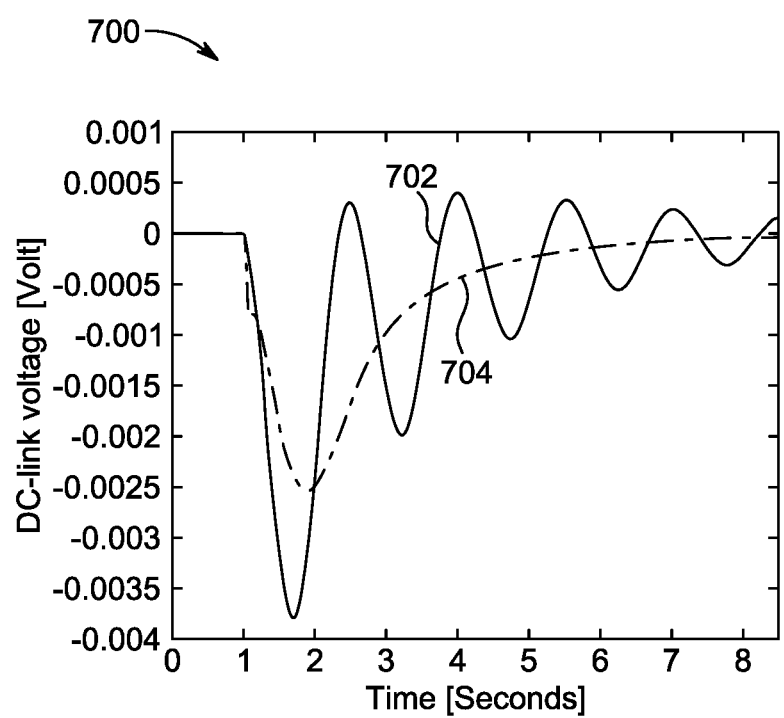
FIG. 7 shows a graphical representation illustrating a detailed comparison of DC-link voltage between the conventional tuned and whale optimization and clustering based DL model over the second power system network, according to certain embodiments.

FIG. 7 shows a graphical representation 700 illustrating a detailed comparison of DC-link voltage between the conventional tuned and whale optimization and clustering based DL model over the power system network 100A, according to an embodiment. As shown in FIG. 7, X axis represents time, while Y axis represents the DC-voltage value. Furthermore, curve 702 represents the DC voltage value generated through the conventional model, and curve 704 represents the whale optimization and clustering based DL model. It is observed in FIG. 7, that the whale optimization and clustering based DL model appeared as a competing candidate for improving real-time stability of the power system network 100A.

Figure 8:
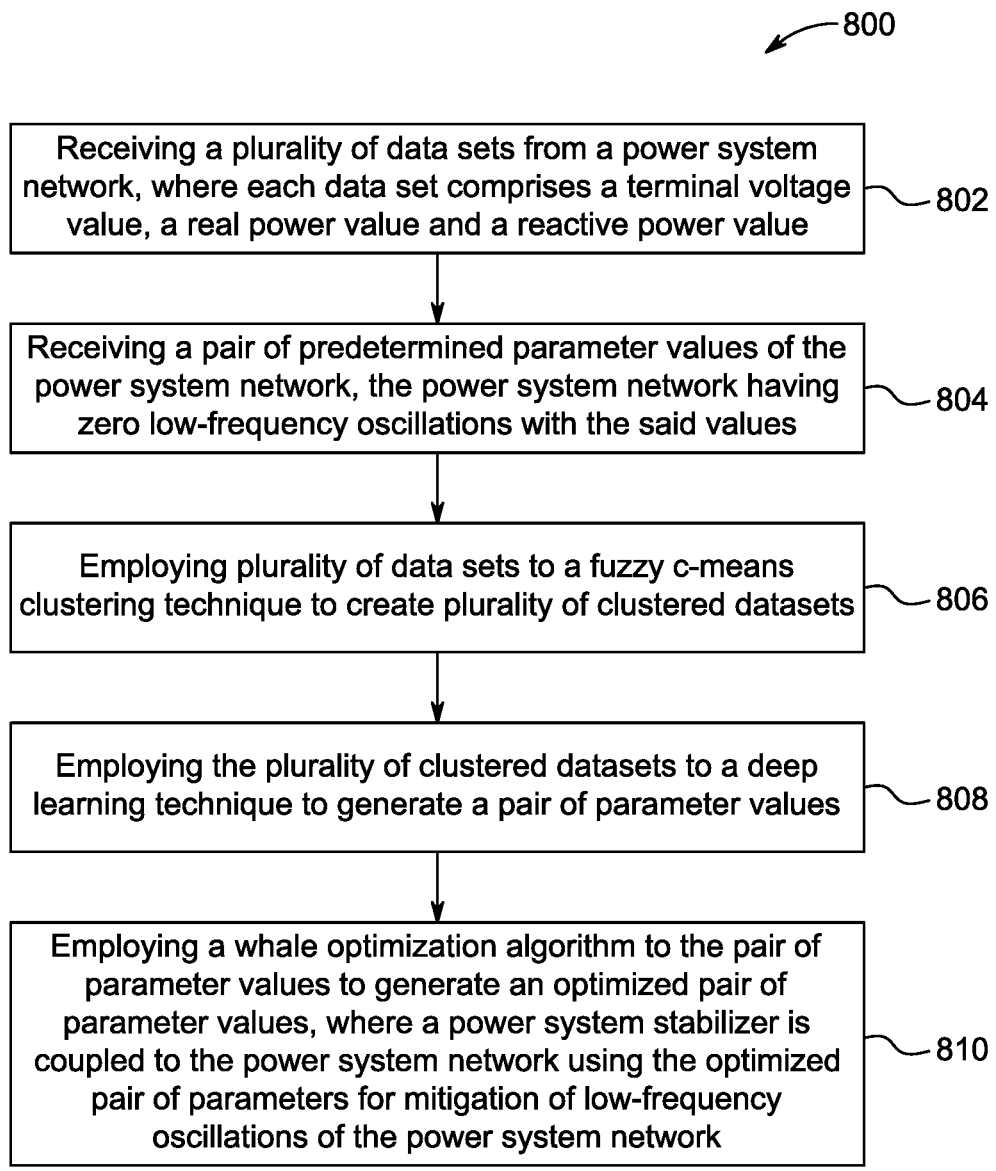
FIG. 8 illustrates a flowchart of a method for mitigation of low-frequency oscillations of power system network, according to certain embodiments.

FIG. 8 illustrates a flowchart of a method 800 for mitigation of low-frequency oscillations of the power system network 100 or the power system network 100A, according to an embodiment. The method 800 is described in conjunction with FIG. 1 and FIG. 2, and experiment observations from FIG. 3A to FIG. 7. The method 800 may be implemented in the LFO mitigation system 200. The LFO mitigation system 200 may represent a hardware system configured to execute steps as provided in the method 800. Various steps of the method 800 are included through blocks in FIG. 8. One or more blocks may be combined or eliminated to achieve method for mitigation of low-frequency oscillations of the power system network 100 or the power system network 100A, without departing from the scope of the embodiments herein.

At step 802, the method 800 includes receiving a plurality of data sets from the power system network 100 or the power system network 100A. Each data set comprises a terminal voltage value ($V_t$), a real power ($P_e$) value, and a reactive power value ($Q_e$).

At step 804, the method 800 includes receiving a pair of predetermined parameter values of the power system network 100 or the power system network 100A. The power system network 100 or the power system network 100A has zero low-frequency oscillations with the said values.

At step 806, the method 800 includes employing plurality of data sets to a fuzzy c-means clustering technique to create a plurality of clustered data sets.

At step 808, the method 800 includes employing the plurality of clustered data sets to a deep learning technique to generate a pair of parameter values.

At step 810, the method 800 includes employing a whale optimization algorithm to the pair of parameter values to generate an optimized pair of parameter values. In an implementation, power system stabilizer (PSS) 102 or power system stabilizer (PSS) 102A coupled to the power system network 100 or the power system network 100A, respectively, using the optimized pair of parameters for mitigation of low-frequency oscillations of the power system network 100 or 118.

Based upon the numerous examples and experimental observations, in the present embodiments, the whale optimization and FCM clustering based DL model were implemented to attenuate undesired LFO from the power system network 100 and the power system network 100A. Two alternative power system networks, the PSS-only power system, and the PSS-coordinated power system with UPFC, were used for testing purpose to examine the whale optimization and clustering based DL model and determine their parameter accuracy. The effectiveness of the developed model was then thoroughly analyzed to ensure the stability of the power system network 100 and the power system network 100A in real time. The efficiency and reliability of the suggested models were compared to traditional and published studies using eigenvalues and MDR values under various operating circumstances. Based upon time-domain simulation results for both the power system network 100 and the power system network 100A, the whale optimization and clustering based DL model showed higher efficiency in dampening the LFO within tolerable timescales compared to the conventional models in the art. The efficacy in forecasting the PSS key parameters was demonstrated by the RMSE, MAPE, RSR, $R^2$, and WIA fair values of the SPI. According to experimental observations, estimating the PSS parameters using the whale optimization and clustering based DL was found to be 35 times lower than a single cycle of a 60 Hz system in any operational setting. Further, the whale optimization and clustering based DL showed high efficiency for real-time adjustment of PSS parameters for improved system stability.

Numerous modifications and variations of the present embodiments are possible in light of the above teachings. For example, other input parameter may be considered while developing the data sets to training the learning systems, such as an impedance, a phase value of a voltage and a current, magnitude of the current value etc. Also, the applicability of the whale optimization and clustering based DL model might be examined on other power system networks, notably multi-machine power system networks. It is therefore to be understood that within the scope of the appended claims, the invention may be practiced otherwise than as specifically described herein.

The invention claimed is:

1. A method for mitigation of low-frequency oscillations of a power system network, comprising:
   receiving a plurality of data sets from the power system network, wherein each data set of the plurality of data sets comprises a terminal voltage value, a real power value and a reactive power value;
   receiving a pair of predetermined parameter values of the power system network, the power system network having zero low-frequency oscillations with the said values;
   subjecting the plurality of data sets to a fuzzy c-means clustering technique to create a plurality of clustered data sets;
   subjecting the plurality of clustered data sets and the pair of predetermined parameter values to a deep learning technique to generate a pair of parameter values;
   subjecting the pair of parameter values to a whale optimization algorithm to generate an adjusted pair of parameter values; and
   applying the adjusted pair of parameter values to a power system stabilizer coupled to the power system network for mitigation of low-frequency oscillations of the power system network.

2. The method of claim 1, further comprising controlling a steady state of the power system stabilizer with the adjusted pair of parameter values.

3. The method of claim 2, wherein the pair of parameter values comprises a network gain parameter and a time constant parameter.

4. The method of claim 1, further comprising:
   training the deep learning technique using a plurality of sets of operating conditions of the power system network.

5. The method of claim 4, wherein each set of operating conditions of the plurality of sets of operating conditions are selected from a group consisting of a terminal voltage value, a real power, and a reactive power value.

6. The method of claim 1, further comprising:
   training the deep learning technique using the pair of predetermined parameter values of the power system network.

7. The method of claim 1, wherein the deep learning technique comprises at least two deep learning subnetworks.

8. The method of claim 7, further comprising training the at least two deep learning subnetworks using the plurality of clustered data sets.

9. The method of claim 1, wherein the power system network is a single machine infinite bus (SMIB).

10. The method of claim 1, wherein the power system stabilizer is coupled to a first terminal of a synchronous generator.

11. The method of claim 10, wherein a single-machine infinite bus is connected to a second terminal of the synchronous generator via a transmission line.

12. The method of claim 1, wherein the power system stabilizer is a single-stage lead-lag controller.

13. The method of claim 1, wherein the power system stabilizer is electrically coupled to a unified power flow controller.

14. The method of claim 1, wherein the power system network comprises a plurality of modes of steady state.

15. The method of claim 14, further comprising
   employing the fuzzy c-means clustering technique, the deep learning technique, and the whale optimization algorithm to obtain the plurality of modes of steady state of the power system network.

* * * * *